(12) United States Patent
Glasgow et al.

(10) Patent No.: US 7,321,014 B2
(45) Date of Patent: Jan. 22, 2008

(54) TRANSPARENT COMPOSITIONS, METHODS FOR THE PREPARATION THEREOF, AND ARTICLES DERIVED THEREFROM

(75) Inventors: Katherine Glasgow, Evansville, IN (US); Brian Mullen, Mt. Vernon, IN (US); Paul D. Sybert, Evansville, IN (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 11/025,249

(22) Filed: Dec. 29, 2004

(65) Prior Publication Data

US 2006/0142527 A1 Jun. 29, 2006

(51) Int. Cl.
*C08L 69/00* (2006.01)
*C08L 83/10* (2006.01)

(52) U.S. Cl. .................. 525/464; 525/446; 528/286; 528/26; 528/29

(58) Field of Classification Search .............. None
See application file for complete search history.

(56) References Cited

U.S. PATENT DOCUMENTS

| | | | |
|---|---|---|---|
| 3,207,814 A | 9/1965 | Goldberg | |
| 3,686,355 A | 8/1972 | Gaines, Jr. et al. | |
| 4,127,560 A | 11/1978 | Kramer | |
| 4,154,775 A | 5/1979 | Axelrod | |
| 4,191,685 A | 3/1980 | Haaf et al. | |
| 4,217,438 A | 8/1980 | Brunelle et al. | |
| 4,281,099 A | 7/1981 | Maresca | |
| 4,308,406 A | 12/1981 | Takenaka et al. | |
| 4,487,896 A | 12/1984 | Mark et al. | |
| 4,579,906 A | 4/1986 | Zabrocki et al. | |
| 4,600,632 A | 7/1986 | Paul et al. | |
| 4,617,368 A | 10/1986 | Freitag et al. | |
| 4,663,413 A | 5/1987 | Ward et al. | |
| 4,681,922 A | 7/1987 | Schmidt et al. | |
| 4,692,490 A | 9/1987 | Abolins | |
| 4,937,031 A | 6/1990 | Curry | |
| 4,963,595 A | 10/1990 | Ward et al. | |
| 4,992,322 A | 2/1991 | Curry et al. | |
| 4,994,532 A | 2/1991 | Hawkins et al. | |
| 5,032,661 A * | 7/1991 | Serini et al. ............... 528/21 |
| 5,126,495 A | 6/1992 | Serini et al. | |
| 5,214,118 A | 5/1993 | Hawkins et al. | |
| 5,321,114 A | 6/1994 | Fontana et al. | |
| 5,322,882 A | 6/1994 | Okamoto | |
| 5,360,861 A | 11/1994 | Campbell | |
| 5,414,057 A | 5/1995 | Campbell et al. | |
| 5,451,632 A | 9/1995 | Okumura et al. | |
| 5,488,086 A | 1/1996 | Umeda et al. | |
| 5,510,414 A | 4/1996 | Okamoto et al. | |
| 5,521,230 A | 5/1996 | Bhatia et al. | |
| 5,530,083 A | 6/1996 | Phelps et al. | |
| 5,552,463 A | 9/1996 | Akkapeddi et al. | |
| 5,608,026 A | 3/1997 | Hoover et al. | |
| 5,616,674 A | 4/1997 | Michel et al. | |
| 5,652,312 A | 7/1997 | Phelps et al. | |
| 5,714,567 A | 2/1998 | Idage et al. | |
| 5,821,321 A | 10/1998 | Archey et al. | |
| 5,821,322 A | 10/1998 | Brunelle et al. | |
| 5,886,073 A | 3/1999 | McCloskey et al. | |
| 5,986,019 A | 11/1999 | Archey et al. | |
| 6,072,011 A | 6/2000 | Hoover | |
| 6,087,468 A | 7/2000 | Hoeks et al. | |
| 6,103,837 A * | 8/2000 | Hiiro et al. ............... 525/464 |
| 6,252,013 B1 | 6/2001 | Banach et al. | |
| 6,346,597 B1 | 2/2002 | Banach et al. | |
| 6,479,485 B2 | 11/2002 | Buckman et al. | |
| 6,492,485 B1 | 12/2002 | Gohr et al. | |
| 6,506,871 B1 | 1/2003 | Silvi et al. | |
| 6,657,018 B1 | 12/2003 | Hoover | |
| 6,723,864 B2 | 4/2004 | Silva et al. | |
| 6,790,929 B2 | 9/2004 | Silvi et al. | |
| 6,833,422 B2 | 12/2004 | Silva et al. | |
| 6,861,482 B2 | 3/2005 | Brunelle et al. | |
| 6,870,013 B2 | 3/2005 | Silva et al. | |
| 2003/0105226 A1 | 6/2003 | Celia et al. | |
| 2003/0195295 A1 | 10/2003 | Mahood et al. | |
| 2003/0207123 A1 | 11/2003 | Brunelle et al. | |
| 2004/0039145 A1 | 2/2004 | Silva et al. | |
| 2004/0220330 A1 | 11/2004 | DeRudder et al. | |
| 2005/0032988 A1 | 2/2005 | Silva et al. | |
| 2005/0159577 A1 | 7/2005 | Davis et al. | |

FOREIGN PATENT DOCUMENTS

| | | |
|---|---|---|
| EP | 0 254 054 B1 | 6/1987 |
| EP | 0 434 848 B1 | 7/1990 |
| EP | 0 517 927 B1 | 12/1991 |
| EP | 0 524 731 B1 | 6/1992 |
| EP | 0645422 | 3/1995 |
| EP | 0376052 | 3/1996 |
| EP | 0692522 | 9/2002 |
| GB | 2043083 | 3/1979 |
| WO | WO80/00084 | 1/1980 |
| WO | WO 03/010220 | 2/2003 |
| WO | 04076541 | 9/2004 |
| WO | WO 04/076541 | 9/2004 |

OTHER PUBLICATIONS

Brian Mullen; "High Heat Ductile (HHD) Copolymers by Reactive Extrusion"; Society of Plastics Engineers Annual Technical Conference; ScholarONE Manuscript Central; pp. 1-4.

(Continued)

*Primary Examiner*—Marc S. Zimmer

(57) ABSTRACT

A thermoplastic composition is disclosed, comprising the reaction product of: a polyester polycarbonate comprising a polyester unit and a polycarbonate unit; a polysiloxane polycarbonate copolymer having a haze of 30% or less, comprising a polycarbonate unit and a polysiloxane unit; and a transesterification catalyst. The resulting thermoplastic composition has a haze of 30% or less as measured according to ASTM D1003-00 at a thickness of 3.2 millimeters. A method of forming the composition and articles formed from the composition are also disclosed.

31 Claims, 2 Drawing Sheets

OTHER PUBLICATIONS

ASTM D256-04 "Standard Test Methods for Determining the Izod Pendulum Impact Resistance of Plastics" pp. 1-20.
ASTM D 1003-00 "Standard Test Method for Haze and Luminous Transmittance of Transparent Plastics" pp. 1-6.
JP 04-225062. Publication Date: Aug. 14, 1992 "Polycarbonate Resin Composition" (Abstract Only).
JP1989-199841. Application Date: Feb. 4, 1988. "A Multilayer Oriented Bottle" Translated from Japanese by the Ralph McElroy Translation Company.
International Search report for International Application No. PCT/US2005/046401, mailed Jan. 2, 2007, 6 pages.

* cited by examiner

70 PEC: 30 PSC blend

70 PEC: 30 PSC plus TBPH

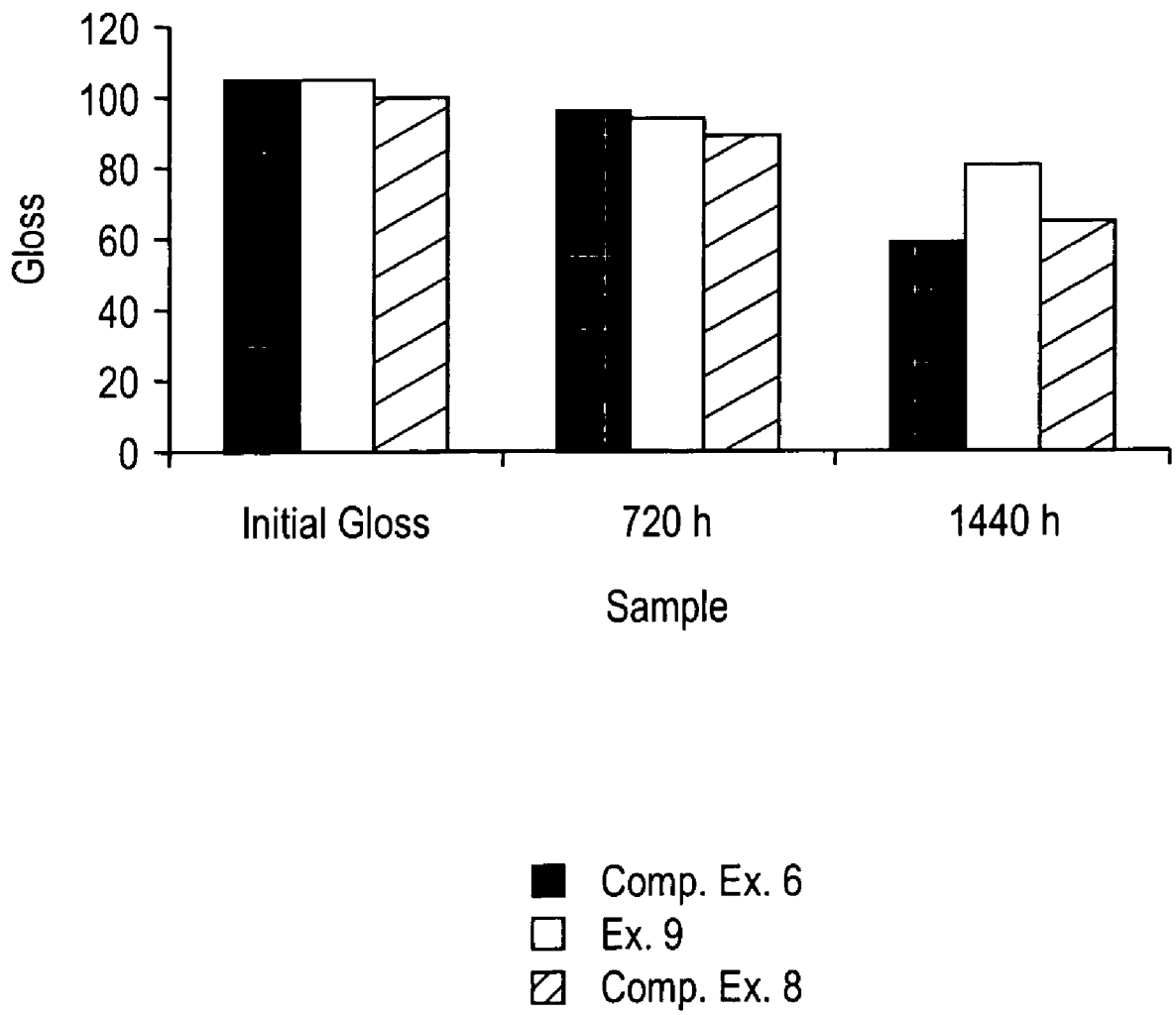

TRANSPARENT COMPOSITIONS, METHODS FOR THE PREPARATION THEREOF, AND ARTICLES DERIVED THEREFROM

BACKGROUND OF THE INVENTION

This disclosure relates to thermoplastic compositions, specifically copolymer compositions comprising a combination of ester units, carbonate units, and siloxane units, methods of manufacture of such copolymers, and articles and uses thereof.

Thermoplastic compositions comprising polycarbonates are known for their impact strength, transparency, and melt-flow characteristics, and are used in the manufacture of articles and components for a wide range of applications, from automotive parts, to packaging materials, to electronic appliances. The properties of thermoplastic polycarbonate polymers may be further adjusted by the inclusion of discrete, compositionally different polymer units. Condensation copolymers comprising polyesters and polycarbonates, and particularly those compositions additionally comprising polysiloxanes, exhibit advantageous non-Newtonian melt viscosity behavior and better low temperature ductility and thick section impact than corresponding non-polysiloxane-containing polyester polycarbonates.

However, copolymer combinations containing aromatic ester units, carbonate units, and siloxane units have been found to exhibit phase separation, as evidenced by low transparency and high degrees of haze. These optical characteristics can limit the utility and potential applications of such copolymers. There accordingly remains a need for copolymers containing aromatic ester units, carbonate units, and siloxane units wherein the melt flow and/or ductility properties of the combination is achieved while maintaining high transparency and low haze.

Terpolymers containing these functional units may be prepared by solution phase polymerization. However, the de novo preparation of such terpolymers by solution phase polymerization may be expensive to justify for a developing market, and may not benefit sufficiently from economies of scale to be profitable. It is desirable therefore to prepare thermoplastic compositions that perform equivalently and that may be prepared by more readily scaled processes from bulk feedstock, without the isolation and workup expenses of a basic synthetic approach. In particular, it would be desirable to develop methods for the manufacture of copolymers comprising aromatic ester, carbonate, and siloxane units that do not rely on solution phase polymerization.

SUMMARY OF THE INVENTION

A first embodiment comprises a thermoplastic composition that is a reaction product of a mixture comprising a copolymer comprising
aromatic ester units of formula (1)

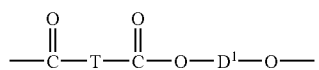

wherein T is a divalent aromatic radical and $D^1$ is a divalent organic radical, and aromatic carbonate units of formula (2)

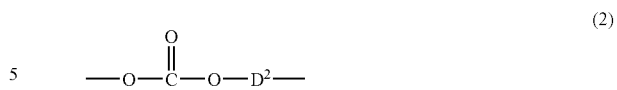

wherein at least 60% of the total number of $D^2$ groups are divalent aromatic organic radicals and the balance thereof are divalent aliphatic, alicyclic, or aromatic radicals;
a copolymer comprising carbonate units of formula (2) and repeating siloxane units of formula (3)

wherein each occurrence of $R^3$ is independently H or $C_1$-$C_{12}$ hydrocarbyl, and the second copolymer has a haze of less than or equal to 30%, measured according to ASTM D1003-00 at a thickness of 3.2 millimeters; and
a transesterification catalyst, wherein the reaction product has a haze of less than or equal to 30%, measured according to ASTM D1003-00 at a thickness of 3.2 millimeters.

In another embodiment, a method of manufacture comprises blending the above-described mixture wherein the combination of copolymers, including the individual compositions of the copolymers, the specific catalyst, the relative amounts of these, and the reaction conditions (e.g., heat input, dispersion) are selected such that the method produces a thermoplastic composition comprising a copolymer comprising units of formula (1), formula (2), and formula (3).

In another embodiment, an article comprises the above-described thermoplastic composition.

In another embodiment, the reaction product formed by the method detailed above is provided.

BRIEF DESCRIPTION OF THE FIGURES

FIG. 3 is a comparison of weathering data for thermoplastic compositions of Example 9.

DETAILED DESCRIPTION OF THE INVENTION

Figure 1:
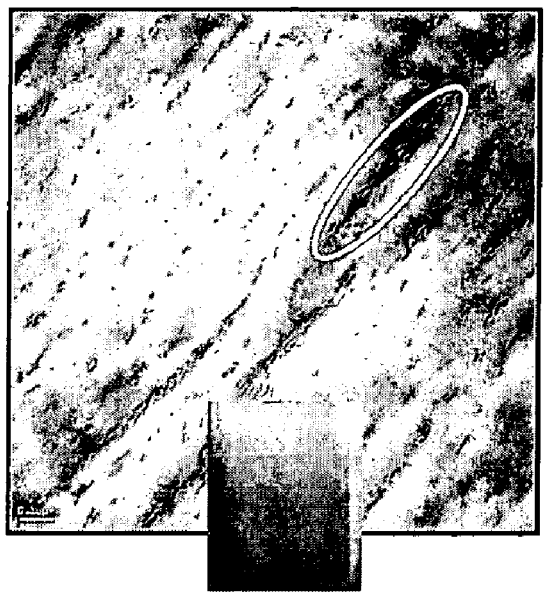
FIG. 1 is a transmission electron microscope (TEM) image of a blend of a polyester polycarbonate with a polycarbonate polysiloxane, prepared without a transesterification catalyst.

Thermoplastic compositions with high melt flow rates and/or high ductility are disclosed, and are formed by reacting a mixture of copolymers in the presence of an effective amount of heat and a transesterification catalyst. The reaction mixture contains a copolymer comprising ester units and carbonate units and a copolymer containing siloxane units and carbonate units. Other polymers or copolymers may also be present in the reaction mixture, subject to the requirement that they be selected such that the product produced has the desired optical properties. Because it has been found that melt-blending of the same copolymers in the absence of a transesterification catalyst yields generally opaque blends that exhibit significant haze, it is surprising that the optical properties of the inventive reaction products may be adjusted from opaque to translucent or transparent by varying the copolymer composition, catalyst, catalyst loading, processing temperature, residence time, and reactor or extruder design. In one embodiment, the reaction product is transparent, with low haze.

The reaction mixture first comprises a copolymer comprising ester units and carbonate units, which for convenience may be referred to herein as a "polyester polycarbonate." Suitable aromatic ester units are of formula (1):

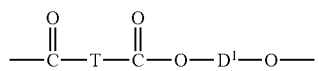
(1)

wherein T is a divalent radical derived from a dicarboxylic acid or dicarboxylic acid derivative such as a dihalide or diester, or other dicarboxylic acid derivative. T may be, for example, a $C_{2-10}$ alkylene radical, a $C_{6-20}$ alicyclic radical, a $C_{6-20}$ alkyl aromatic radical, or a $C_{6-20}$ aromatic radical. Examples of suitable aromatic dicarboxylic acids that may be used to prepare the polyester units include isophthalic acid, terephthalic acid, 1,2-di(p-carboxyphenyl)ethane, 4,4'-dicarboxydiphenyl ether, 4,4'-bisbenzoic acid, and mixtures comprising at least one of the foregoing acids. Aromatic acids containing fused rings may also be used, such as 1,4-, 1,5-, or 2,6-naphthalenedicarboxylic acids. Combinations comprising at least one of the foregoing aromatic acids may also be used.

Specific dicarboxylic acids are terephthalic acid, isophthalic acid, naphthalene dicarboxylic acid, cyclohexane dicarboxylic acid, or mixtures thereof. A mixture of isophthalic acid and terephthalic acid wherein the molar ratio of terephthalic acid to isophthalic acid is 99:1 to 1:99, specifically 98:2 to 40:60 may be used.

Further in formula (1), $D^1$ is a divalent organic radical derived from a dihydroxy compound, and may be, for example, a $C_{2-10}$ alkylene radical, a $C_{6-20}$ alicyclic radical, a $C_{6-20}$ aromatic radical, a bis-$C_{12-20}$ aromatic radical, or a polyoxyalkylene radical in which the alkylene groups contain 2 to 6 carbon atoms, specifically 2, 3, or 4 carbon atoms. In one embodiment, each $D^1$ is an aromatic organic radical, for example a radical of formula (4):

$$-A^1-Y^1-A^1- \quad (4)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, and $C_{1-18}$ alkylene, including methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. The ester units may be derived from a dihydroxy compound having the formula HO-$D^1$-OH, which includes dihydroxy aromatic compounds of formula (5)

$$HO-A^1-Y^1-A^2-OH \quad (5)$$

wherein $Y^1$, $A^1$ and $A^2$ are as described above. In one embodiment, $D^1$ is derived from a bis-$C_{12-20}$ aromatic dihydroxy compound of formula (6):

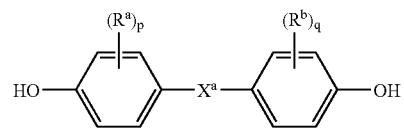
(6)

wherein $R^a$ and $R^b$ are each independently halogen atom, a heteroatom-containing monovalent hydrocarbon group, or a monovalent hydrocarbon group, and may be the same or different; p and q are each independently integers of 0 to 4; and $X^a$ is one of the groups of formula (7):

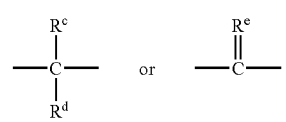
(7)

wherein $R^c$ and $R^d$ are each independently a hydrogen atom or a monovalent linear or cyclic hydrocarbon group and $R^e$ is a divalent hydrocarbon group.

$D^1$ may also be a divalent $C_{6-20}$ aromatic radical derived from a dihydroxy compound of formula (8):

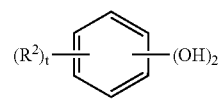
(8)

wherein each $R^2$ is independently a halogen atom, a $C_{1-12}$ alkyl group, or a $C_{1-10}$ halogen-substituted alkyl group, and t is 0 to 4. The halogen may be fluorine, chlorine, or bromine. Alkyl groups, if present, are in various embodiments straight-chain, branched or cyclic alkyl groups, and are most often located in the ortho position to both oxygen atoms, although other ring locations are contemplated. Suitable $C_{1-12}$ alkyl groups include, but are not limited to, methyl, ethyl, n-propyl, isopropyl, butyl, iso-butyl, t-butyl, nonyl, decyl, dodecyl and aryl-substituted alkyl, including benzyl. In a particular embodiment a suitable alkyl group is methyl.

Some illustrative, non-limiting examples of suitable dihydroxy compounds for the formation of the ester units include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 4-bromoresorcinol, 2,4,5,6-tetrafluororesorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, or 2,3,5,6-tetrabromo hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)

diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, or 2,7-dihydroxycarbazole; those containing indane structural units such as 3-(4-hydroxyphenyl)-1,1,3-trimethylindan-5-ol, 1-(4-hydroxyphenyl)-1,3,3-trimethylindan-5-ol, 2,2,2',2'-tetrahydro-1,1'-spirobi[1H-indene]diols such as 2,2,2',2'-tetrahydro-3,3,3',3'-tetramethyl-1,1'-spirobi[1H-indene]-6,6'-diol (sometimes known as "SBI"), and the like, as well as combinations comprising at least one of the foregoing dihydroxy compounds.

Specific examples of dihydroxy compounds of formula (6) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Specific examples of compounds of formula (8) include resorcinol and substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, and 2,4,5,6-tetrabromo resorcinol Combinations comprising at least one of the foregoing dihydroxy compounds may also be used.

Specific types of polyester units are those of formula (9):

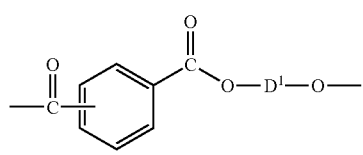

(9)

wherein $D^1$ is as described above, and wherein the polymer chain carboxyl groups on the aromatic acid radical may be distributed ortho-, meta-, or para- to one another on the aromatic ring. Further, the aromatic acid radical may be a combination of one or more of the ortho-, meta-, or para-disubstituted forms. In one embodiment, $D^1$ is derived from a bisphenol of formula (6), for example 1,1-bis(4-hydroxyphenyl)methane, 1,1-bis(4-hydroxyphenyl)ethane, bisphenol A, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, or a combination comprising at least one of the foregoing bisphenols. In another embodiment, $D^1$ in Formula (9) is derived from resorcinol, or a resorcinol of Formula (8) wherein $R^2$ is a $C_{1-12}$ alkyl group and t is one. Combinations comprising at least one of the foregoing resorcinol compounds may also be used.

In addition to ester units, the first copolymer further comprises carbonate units of formula (2):

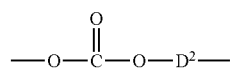

(2)

in which at least 60 percent of the total number of $D^2$ groups are divalent aromatic organic radicals and the balance thereof are aliphatic, alicyclic, or aromatic radicals. $D^2$ may be derived from bisphenol compounds of general formula (6) as described above, and/or dihydroxy compounds of formula (8) above. Thus, each $D^1$ and $D^2$ in the first copolymer may be the same or different.

Specific examples of the types of bisphenol compounds that may be used to form the carbonate units include 1,1-bis(4-hydroxyphenyl)methane, 1,1-bis(4-hydroxyphenyl)ethane, bisphenol A, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

A number of methods for the preparation of copolymers comprising ester units and carbonate units are known, and may be suitable for use herein. Specifically, the method used is one that produces a transparent copolymer, further a transparent copolymer having low haze.

For example, copolymers comprising polyester blocks and carbonate units or blocks (also known as "block copolyestercarbonates") may prepared by first preparing a hydroxy-terminated polyester intermediate having a degree of polymerization of at least 4, via the interfacial reaction of at least one dihydroxy compound, for example a 1,3-dihydroxybenzene, with at least one dicarboxylic acid derivative, for example an aromatic dicarboxylic acid dichloride. In a specific example, the polyester intermediate may be synthesized reacting unsubstituted resorcinol, isophthaloyl dichloride, and terephthaloyl dichloride in water and a substantially immiscible organic solvent, in the presence of a phase transfer catalyst.

The dihydroxy compound, particularly the 1,3-dihydroxybenzenes, may be dissolved, partially dissolved, or suspended in water prior to reaction. Aqueous solutions and water mixtures comprising a 1,3-dihydroxybenzenes may be inhibited from discoloration by providing a pH of 5 or less in the aqueous solution, specifically 4 or less, and in still another embodiment 3 or less. The pH of about 5 or less may be provided using an acid source, for example organic acids such methanesulfonic acid, p-toluenesulfonic acid, lactic acid, malic acid, succinic acid, glutaric acid, adipic acid, citric acid, tartaric acid, glycolic acid, thioglycolic acid, trichloroacetichydrochloric acid, and the like, and/or an inorganic acid such as phosphoric acid, phosphorous acid, sulfuric acid, and the like. The amount of water present in a solution or mixture comprising water may be 0.5 wt % to 70 wt %, specifically 0.5 wt % to 30 wt %, more specifically 1 wt % to 25 wt % of the total solution or mixture.

The phase transfer catalysts may be present at a total level of about 0.1 to about 10 mole %, or 0.2 and about 6 mole %, based on total molar amount of acid chloride groups. Suitable catalysts include comprise tertiary amines, quaternary ammonium salts, quaternary phosphonium salts, guanidinium salts, and mixtures thereof. Suitable tertiary amines include triethylamine, dimethylbutylamine, diisopropylethylamine, 2,2,6,6-tetramethylpiperidine, N—($C_1$-$C_6$)alkyl-pyrrolidines such as N-ethylpyrrolidine, N—($C_1$-$C_6$)piperidines such as N-ethylpiperidine, N-methylpiperidine, and N-isopropylpiperidine, N—($C_1$-$C_6$)morpholines such as N-ethylmorpholine and N-isopropyl-morpholine, N—($C_1$-$C_6$)dihydroindoles, N—($C_1$-$C_6$)dihydroisoindoles, N—($C_1$-$C_6$)tetrahydroquinolines, N—($C_1$-$C_6$)tetrahydroisoquinolines, N—(C1-C6)benzomorpholines, 1-azabicyclo-[3.3.0]-octane, quinuclidine, N—($C_1$-$C_6$)alkyl-2-azabicyclo-[2.2.1]-octanes, N,N—($C_1$-$C_6$)alkyl-2-azabicyclo-[3.3.1]-nonanes, and N—($C_1$-$C_6$)alkyl-3-azabicyclo-[3.3.1]-nonanes, N,N,N', N'-tetraalkylalkylenediamines, including N,N,N',N'-tetraethyl-1,6-hexanediamine. In particular embodiments tertiary amines are triethylamine and N-ethylpiperidine. Suitable quaternary ammonium salts and quaternary phosphonium salts include quaternary ammonium and quaternary phosphonium halides, illustrative examples of which include, but are not limited to, tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (ALIQUAT 336), methyltri-C8-C10-alkyl-ammonium chloride (ADOGEN 464), tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide. Suitable guanidinium salts include, but are not limited to, hexaalkylguanidinium salts and alpha,omega-bis(pentaalkylguanidinium) alkane salts, comprising hexaalkylguanidinium halides, alpha,omega-bis(pentaalkylguanidinium)alkane halides, hexaethylguanidinium halides, and hexaethylguanidinium chloride.

Suitable organic solvents substantially immiscible with water include those that are less than about 5 wt. % soluble in water, or less than about 2 wt. % soluble in water under the reaction conditions, for example dichloromethane, trichloroethylene, tetrachloroethane, chloroform, 1,2-dichloroethane, trichloroethane, toluene, xylene, trimethylbenzene, chlorobenzene, o-dichlorobenzene, the chlorotoluenes, and mixtures thereof. In particular embodiments water-immiscible solvents are chlorinated aliphatic compounds such as dichloromethane.

A chain-stopper (also referred to as capping agent) may also be present. One purpose of adding a chain-stopper is to limit the molecular weight of the polyester intermediate, thus providing intermediates with controlled molecular weight. In other embodiments at least some chain-stopper may be added when polyester intermediate is to be either used in solution or recovered from solution for subsequent use, such as in copolymer formation, which may require the presence of reactive end-groups, typically phenolic hydroxy end groups, on the polyester segments. A chain-stopper may be at least one of mono-phenolic compounds, mono-carboxylic acid chlorides, and/or mono-chloroformates. The amount of chain-stopper added at any time during the reaction may be such as to cap all or at least a portion of polymer chain end-groups. Typically, at least one chain-stopper, when present, may be present in quantities of 0.05 to 10 mole %, based on dihydroxy aromatic compound in the case of mono-phenolic compounds and based on acid dichlorides in the case mono-carboxylic acid chlorides and/or mono-chloroformates.

Suitable mono-phenolic compounds include monocyclic phenols, such as unsubstituted phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, in which in some embodiments about 47 to 89% of the hydrogen atoms are part of methyl groups. A monophenolic UV screener may be used as capping agent, for example 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In various embodiments mono-phenolic chain-stoppers are at least one of phenol, p-cumylphenol, or resorcinol monobenzoate.

Suitable mono-carboxylic acid chlorides include monocyclic, mono-carboxylic acid chlorides, such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

In another embodiment, a branching agent such as a trifunctional or higher functional carboxylic acid chloride and/or trifunctional or higher functional phenol may be used. Such branching agents, if included, can be used in quantities of 0.005 to 1 mole %, based on acid chlorides or dihydroxy compounds used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane. 1,4-bis-[(4,4-dihydroxytriphenyl)methyl]-benzene. The phenolic branching agents may be introduced first with the dihydroxy aromatic compound or during the course of acid chloride addition, while acid chloride branching agents may be introduced together with acid dichlorides.

The total molar amount of acid chloride groups added to the reaction mixture may be stoichiometrically deficient relative to the total molar amount of hydroxyl groups so that hydrolysis of acid chloride groups is minimized. The total molar amount of acid chloride groups includes at least one dicarboxylic acid dichloride, and any mono-carboxylic acid chloride chain-stoppers and any tri- or tetra-carboxylic acid tri- or tetra-chloride branching agents that may be used. The total molar amount of hydroxy groups includes dihydroxy compounds, and any mono-phenolic chain-stoppers and any tri- or tetra-phenolic branching agents that may be used. The stoichiometric ratio of total hydroxy groups to total acid chloride groups may be 1.9:1 to 1.01:1, specifically 1.5:1 to 1.01:1, more specifically 1.25:1 to 1.01:1.

The temperature of the reaction mixture during polyester intermediate preparation may be any convenient temperature that provides a suitable reaction rate and a polyester intermediate substantially free of anhydride linkages. Convenient temperatures include those from about 10° C. to the boiling point of the lowest boiling bulk component in the reaction mixture under the reaction conditions. The reaction may be run under pressure. In various embodiments the reactor pressure may be in the range of from about 0 pounds per square inch gauge reading (psig) to about 100 psig. In some embodiments the reaction temperature may be in a range of between ambient temperature and the boiling point of the water-organic solvent mixture under the reaction conditions. In one embodiment the reaction is performed at the boiling point of the organic solvent in the water-organic solvent mixture. In a particular embodiment the reaction is performed at the boiling point of dichloromethane.

The polyester intermediate may be recovered from the reaction mixture before polyester polycarbonate synthesis. Recovery methods are known to those skilled in the art and may include one or more steps of acidification of the mixture, for example with at least one of an inorganic acid or an organic acid; subjecting the mixture to liquid-liquid phase separation; washing the organic phase with water and/or a dilute acid such as at least one of an inorganic acid or an organic acid; precipitating by usual methods such as through treatment with water or anti-solvent precipitation with, for example, an alcohol such as methanol, ethanol, and/or isopropanol; isolating the resulting precipitates; and drying to remove residual solvents. It is also contemplated, however, to proceed to a subsequent process without acidification or phase separation, and this is often possible without loss of yield or purity in the hydroxy-terminated polyester intermediate.

In another embodiment the polyester intermediate may remain in solution for subsequent process steps. For example, the entire interfacial reaction mixture comprising polyester intermediate, water, and a water-immiscible organic solvent may be carried on to subsequent process steps such as phosgenation to prepare block polyester polycarbonate.

In another embodiment, the polyester intermediate is prepared by a transesterification reaction in the melt by combining a dihydroxy compound with a diester of a dicarboxylic acid. For example, a resorcinol arylate-containing polyester intermediate may be prepared by a transesterification reaction in the melt by combining a 1,3-dihydroxybenzene with a diester of a dicarboxylic acid as described above, for example diphenyl isophthalate, diphenyl terephthalate, or mixtures thereof. Either or both of isophthalate and terephthalate may be present. The molar ratio of dihydroxy compounds to dicarboxylic acid diester is greater than 1:1, specifically 1.01:1 to 1.90:1, more specifically 1.01:1 to 1.25:1.

To form the polyester polycarbonate, the hydroxy-terminated polyester intermediate may be reacted with a carbonate precursor in the presence of a second dihydroxy compound, for example a compound of formula (6), via processes such as interfacial polymerization or melt polymerization. Although the reaction conditions for interfacial polymerization may vary, an exemplary process generally involves dissolving or dispersing hydroxy-terminated polyester intermediate and the second dihydroxy compound in aqueous caustic soda or potash, adding the resulting mixture to a suitable water-immiscible solvent medium, and contacting the reactants with a carbonate precursor in the presence of a suitable phase transfer catalyst as described above, such as triethylamine, under controlled pH conditions, e.g., 8 to 10. The most commonly used water immiscible solvents include methylene chloride, 1,2-dichloroethane, chlorobenzene, toluene, and the like.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. An effective amount of a phase transfer catalyst, such as tetra-n-butylammonium chloride, may be 0.1 to 10 wt %, specifically 0.5 to 2 wt. %, based on the weight of dihydroxy entities in the phosgenation mixture.

Under these conditions a polycarbonate may be formed that is not covalently bound to polyester intermediate. In a particular embodiment wherein a 1,3-dihydroxybenzene is present along with the second dihydroxy aromatic compound, then a polycarbonate copolymer may form with structural units derived from both 1,3-dihydroxybenzene and from the second dihydroxy aromatic compound. The present compositions, may therefore comprise the polyester polycarbonate in combination with at least one polycarbonate, the polycarbonate being made in the same process as the carbonate forming step of the polyester polycarbonate synthesis. When it is desired to prepare a blend of polyester polycarbonate with at least one polycarbonate through synthesis by the present methods, then at least one polycarbonate in the blends may be prepared essentially simultaneously with carbonate formation in the polyester polycarbonate synthesis. Alternatively, a polycarbonate in the blends may be prepared after the polyester polycarbonate formation is at least partially or essentially complete, for example, in one option, through addition of additional components comprising dihydroxy aromatic compound, carbonate precursor, and, optionally, chain-stopper. Typically blends of polyester polycarbonate with up to about 95 wt. % polycarbonate may be prepared through synthesis. In a particular embodiment, blends of polyester polycarbonate comprising bisphenol A carbonate units may be prepared along with polycarbonate comprising bisphenol A.

A branched polycarbonate unit, or segment may also be formed, as well as combinations of linear polycarbonate segments and branched polycarbonate segment. The branched polycarbonates may be prepared by adding a branching agent during polymerization to form the polycarbonate unit. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of 0.05 to 2.0 wt %.

In one embodiment block copolymers may be formed comprising polyester blocks and polycarbonate units or blocks, wherein the polyester blocks and polycarbonate units may each be dispersed randomly, non-randomly, or a combination of randomly and non-randomly in the polymer chain or backbone. One useful type of block copolymer is of formula (10):

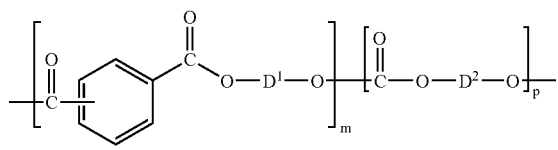

(10)

wherein $D^1$ and $D^2$ may be the same or different. In one embodiment, $D^1$ is derived from resorcinol and $D^2$ is derived from a bisphenol compound such as bisphenol A. The ester blocks in formula 10 may have an average degree of polymerization (represented by m) of 4 to 300, more specifically from 10 to 150, still more specifically from 20 to 150, or 30 to 150. The average degree of polymerization of the carbonate units (represented by p) may be 1 to 200, specifically 3 to 100, more specifically 20 to 50. In a particular embodiment, a block copolymer of this type comprises at least one ester block and at least two carbonate blocks. In another particular embodiment a block copolymer comprises an A-B-A architecture with at least one ester block ("B") and at least two carbonate blocks ("A"). In another particular embodiment a block copolymer comprises a B-A-B architecture with at least two ester blocks ("B") and at least one carbonate block ("A"). Mixtures of block copolymers with different architectures are also within the scope of the invention.

The ratio of ester units to carbonate units in the copolymers may vary broadly, for example 10 to 99 wt. % ester units and 90 to 1 wt. % carbonate units, depending on the desired properties of the final composition. For example, some injection molding applications may use from 5 to 60% by weight ester blocks, whereas certain film applications may use 60 to 95% by weight ester units. The copolymers contain in one embodiment about 10% to about 99% by weight ester blocks; in another embodiment about 40% to about 99% by weight ester blocks; in another embodiment about 60% to 98% by weight ester blocks; in another embodiment about 80% to about 96% by weight ester blocks; and in still another embodiment about 85% to about 95% by weight ester blocks.

In one specific embodiment, the polyester unit is derived from the reaction of a combination of isophthalic and terephthalic diacids (or derivatives thereof) with bisphenol A, wherein the ratio of isophthalate units to terephthalate units is 50:50 to 99:1, more specifically 85:15 to 97:3; and the polycarbonate unit is derived from bisphenol A such that the ratio of the mixed isophthalate-terephthalate polyester unit to the polycarbonate unit is 99:1 to 1:99, more specifically 95:5 to 30:70.

The reaction mixture for the formation of the inventive thermoplastic compositions further comprises a second copolymer, that is a copolymer comprising siloxane units and carbonate units (sometimes referred to herein for convenience as "polysiloxane polycarbonate"), wherein the polysiloxane units and polycarbonate units may each be distributed randomly, non-randomly, or a combination of randomly and non-randomly along the polymer chain or backbone. As used herein, "randomly" means that any two polysiloxane units may be separated from each other by a random number of carbonate units. In one embodiment, the polysiloxane units and polycarbonate units are dispersed in the polymer chain as a combination of randomly and non-randomly distributed units. More specifically, the polysiloxane units are substantially randomly dispersed within the polymer chain. As used herein, "substantially randomly" means that greater than or equal to 90 mol-%, specifically greater than or equal to 95 mol-%, or most specifically greater than or equal to 99 mol % of polysiloxane units are randomly distributed. It is believed that, where the polysiloxane units are at least substantially randomly dispersed in the polymer chain, the polysiloxane polycarbonate copolymer may be transparent. If the distribution of polysiloxane units within the polymer chain is not sufficiently random, the copolymer may not be transparent. In order to ensure transparency, specific synthesis methods are used such as those described in U.S. Pat. Nos. 6,723,864, 6,657,018, 5,530,083 and 5,616,674; in published Patent Application Nos. US2004/0039145, US2004/0220330A1, and in commonly owned U.S patent application Ser. No. 10/638,622 filed Aug. 8, 2003, all of which are incorporated herein by reference.

In addition to the structural carbonate units of formula (2) described above, the polysiloxane polycarbonates comprises diorganosiloxane units of formula (3):

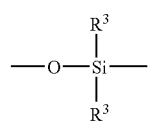

(3)

wherein each occurrence of $R^3$ may be the same or different and is independently a $C_{1-12}$ hydrocarbyl. The diorganosiloxane units are generally present in the form of blocks containing 1 to 1000 units, specifically 10 to 100, more specifically 25 to 75, and most specifically 40 to 60. As is readily understood by one of ordinary skill in the art, the number of diorganosiloxane units represents an average value.

A specific type of suitable polysiloxane polycarbonate copolymer (also known as a poly(siloxane-carbonate) or a poly(carbonate-siloxane) copolymer) comprises units of formula (11):

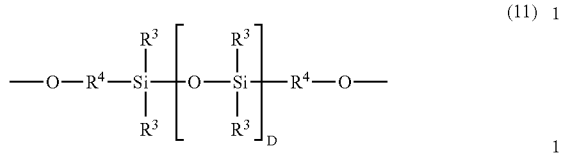

(11)

wherein $R^3$ is as described above, D is 1 to 1000, each occurrence of $R^4$ is independently a divalent $C_1$-$C_{30}$ hydrocarbylene, and wherein the polymerized polysiloxane unit is the reaction residue of its corresponding dihydroxy compound. In one embodiment, each occurrence of $R^4$ independently has structure (12):

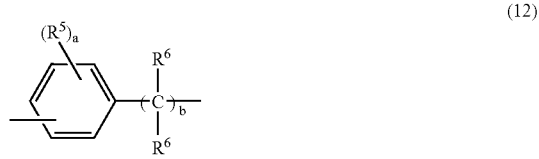

(12)

wherein each occurrence of $R^6$ is independently H or $C_1$-$C_{12}$ hydrocarbyl. Each $R^5$ in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, and b is 2 to 8, or 1-8 where at least one $R^6$ is not hydrogen. Each a is independently 0, 1, 2, 3, or 4, and when a is less than 4, a hydrogen is substituted to the aromatic ring such that the total number of hydrogens on the aromatic ring is 4-a. In one embodiment, the aryl end has connectivity to an oxygen atom, and the alkyl end has connectivity to a silicon atom. In another embodiment, the oxygen substituent may be disposed ortho, meta, or para to the —$C(R^6)_2$)-group.

In a specific embodiment, the polysiloxane units comprise repeating structural units of the formula (13):

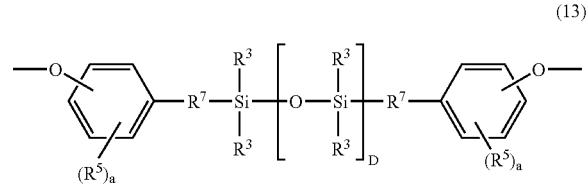

(13)

wherein $R^3$, D, and $R^5$ are as described above, $R^7$ is a divalent organic radical preferably disposed in the ortho or para position relative to the backbone oxygen, and wherein the polymerized unit is the reaction residue of its corresponding dihydroxy compound. For example, $R^7$ may be a $C_1$-$C_{13}$ alkylene, $C_1$-$C_{13}$ alkyleneoxy, $C_2$-$C_{13}$ alkenyl, $C_2$-$C_{13}$ alkenyloxy, $C_3$-$C_6$ cycloalkylene, $C_3$-$C_6$ cycloalkleneoxy, $C_6$-$C_{10}$ arylene, $C_6$-$C_{10}$ aryleneoxy, $C_7$-$C_{13}$ aralkylene, $C_7$-$C_{13}$ aralkylenoxy, $C_7$-$C_{13}$ alkarylene, or $C_7$-$C_{13}$ alkaryleneoxy. Combinations of the foregoing $R^7$ groups may be used in the same copolymer. In one embodiment, each $R^3$ in formula (13) may be the same or different, and is selected from the group consisting of $C_{1-8}$ alkyl and $C_{6-13}$ aryl; a is 1; each $R^5$ is a $C_{1-3}$ alkoxy; and each $R^7$ is a $C_1$-$C_{13}$ alkylene. In another specific embodiment, each $R^3$ is a $C_1$-$C_3$ alkyl; each $R^5$ is a $C_1$-$C_3$ alkoxy or a $C_1$-$C_3$ alkyl; a is 1; and each $R^7$ is a dimethylene, trimethylene or tetramethylene. In another embodiment, each $R^3$ is methyl, each $R^5$ is methoxy, a is 1, and each $R^7$ is a divalent $C_1$-$C_3$ aliphatic group.

In a further embodiment, the polysiloxane units comprise repeating structural units of formula (22);

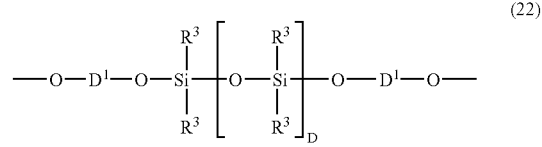

(22)

wherein D is 1 to 1000 and $D^1$ is as defined above. In this formula, the polysiloxane unit is connected through an oxygen linkage to an end group, wherein each end group is independently the reaction residue of a dihydroxy compound of the formula HO-$D^1$-OH, which also includes dihydroxy compounds of formula (5). Specifically, in one embodiment, the dihydroxy compound is a dihydroxy aromatic compound of formula (6).

A hydroxyaryl-terminated polysiloxane can be made by effecting a platinum or palladium catalyzed addition between an aliphatically unsaturated monohydric phenol and a siloxane of the formula (14),

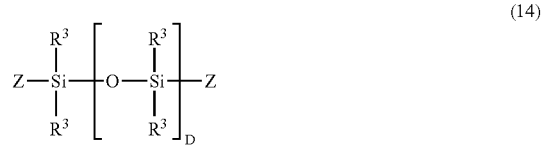

(14)

wherein $R^3$ and D are as previously defined, and Z is H. Some of the aliphatically unsaturated monohydric phenols that can be used to make the hydroxyaryl-terminated poly(diorganosiloxane)s are, for example, 4-allyl-2-methoxy phenol(eugenol), 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 2-allyl-4,6-dimethylphenol, and the like.

A hydroxyaryl-terminated polysiloxane can also be prepared by the condensation of hydride-terminated polysiloxane (14), wherein $R^3$ and D are as defined above, and Z is H, with a halomethyl- or sulfonatomethylene-substituted aryl in the presence of a base or copper catalyst, followed by the removal of any hydroxyl protecting group used, such as acetate or trimethylsilyl. Suitable halomethyl- or sulfonatomethylene-substituted aryls of this type include 4-acetoxybenzyl chloride, 4-trimethylsilylbenzyl chloride, 4-methoxymethyloxybenzyl chloride, 4-acetoxybenzyl toluenesulfonate, 4 trimethylsilylbenzyl toluenesulfonate, and the like.

A hydroxyaryl-terminated polysiloxane can also be prepared by the condensation of polysiloxane (14), wherein $R^3$ and D are as defined above and Z is acetoxy or halogen, specifically Cl, with a dihydroxy aromatic compound of formula (6) as described above, and in either the presence or absence of a base or other catalyst. Specific suitable dihydroxy compounds for this purpose include, but are not limited to, 1,1-bis(4-hydroxyphenyl)methane, 1,1-bis(4-hydroxyphenyl)ethane, bisphenol A, 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

The polysiloxane polycarbonate copolymer may be manufactured by reaction of the corresponding dihydroxy polysiloxane with a carbonate source and a dihydroxy aromatic compound of formula (5), optionally in the presence of a phase transfer catalyst as described above. Among the specific phase transfer catalysts that can be used are catalysts of the formula $(R)_4Q^+X$, wherein each R is, in this instance, the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4$NX, $[CH_3(CH_2)_3]_4$PX, $[CH_3(CH_2)_5]_4$NX, $[CH_3(CH_2)_6]_4$NX, $[CH_3(CH_2)_4]_4$NX, $CH_3[CH_3(CH_2)_2]_3$NX, $CH_3[CH_3(CH_2)_2]_3$NX wherein X in this instance is Cl⁻, Br⁻, or a $C_{1-8}$ alkoxy group or $C_{6-18}$ aryloxy group. An effective amount of a phase transfer catalyst may be 0.1 to 10 wt. % based on the weight of dihydric reactant in the phosgenation mixture. In another embodiment an effective amount of phase transfer catalyst may be 0.5 to 2 wt. % based on the weight of bisphenol in the phosgenation mixture. One or both of the tube reactor processes described in U.S. Patent Application No. 2004/0039145A1 may be used to synthesize the polysiloxane-polycarbonate copolymers.

Alternatively, the polysiloxane-polycarbonate copolymers may be prepared by co-reacting in a molten state, a dihydroxy-terminated polysiloxane, dihydroxy compound (5) and a diaryl carbonate ester, such as diphenyl carbonate, in the presence of a transesterification catalyst as described above. Alternatively, the polysiloxane-polycarbonate copolymers may be prepared by contacting at least one dihydroxy aromatic compound with phosgene, the molar ratio of phosgene to dihydroxyaromatic compound being in the range of about 0.1 to 0.9:1, in an alkaline mixed aqueous-organic liquid at a pH in the range of about 9 to 12, in the presence of at least one trialkylamine as the only catalytic species present and, optionally, at least one monohydroxyaromatic compound or chloroformate thereof as chain termination agent, thereby producing an oligomeric aromatic polycarbonate mixture; combining the mixture with a reagent consisting essentially of at least one polyorganosiloxane bis(aryl)chloroformate at a pH in the range of about 10.5 to 13.5, optionally with additional introduction of at least one of phosgene and at least one monohydroxyaromatic compound or chloroformate thereof as a chain stopper, thereby forming a copolyorganosiloxanecarbonate oligomer mixture; and adding phosgene and, optionally, chain stopper to said copolyorganosiloxanecarbonate-containing mixture to afford a copolyorganosiloxanecarbonate.

Generally, the amount of reactive polysiloxane is selected so as to produce a copolymer comprising a molar ratio of polysiloxane units of Formula (14) to carbonate units of 0.01:99.99 to 60:40, more specifically 0.05:99.95 to 50:50. The values of D and the relative molar ratio of the polysiloxane units of formula (11) to the carbonate units are selected so as to provide an effective level of melt viscosity and other desired characteristics to the thermoplastic composition. The values of D and the molar ratios of polysiloxane:carbonate units will therefore vary depending on the type and relative amount of each component in the thermoplastic composition, including the type and amount of polyester polycarbonate, polysiloxane polycarbonate, and other additives. Where D is of a lower value, e.g., less than 40, it may be desirable to use a relatively larger amount of the polysiloxane units. Conversely, where D is of a higher value, e.g., greater than 40, it may be desirable to use a relatively smaller amount of the polysiloxane units.

In addition, the polysiloxane polycarbonate copolymer may comprise 70 to 99 wt % of carbonate units and 1 to 30 wt. % dimethylsiloxane units, or the molar equivalent of other diorganosiloxane units. Within this range, the polysiloxane polycarbonate copolymer may comprise 75 to 98 wt %, specifically 85 to 95 wt. % of carbonate units and 2 to 25 wt. %, specifically 5 to 15 wt. % dimethylsiloxane units, or the molar equivalent of other diorganosiloxane units.

The polysiloxane polycarbonate copolymer may have a light transmission greater than or equal to 55%, specifically greater than or equal to 60% and more specifically greater than or equal to 70%, as measured according to ASTM D1003-00. The copolymer has a haze less than or equal to 30%, specifically less than or equal to 25%, and most specifically less than or equal to 20%, as measured according to ASTM D1003-00. Without being bound by theory, it is believed that on a molecular scale both the transparency and haze of the polysiloxane polycarbonate copolymer are related to the number of polysiloxane units within the polymer chain, the average size of the polysiloxane unit (as defined by the number of repeating diorganosiloxane sub-units (3)), the random or non-random distribution of the polysiloxane units in the polymer chain, or a combination of one or more of these factors. It is believed that a more random distribution of polysiloxane units within a copolymer provides both a greater degree of transparency and a lesser degree of haze. Reaction conditions, relative amounts of starting materials, and/or types of starting materials may therefore be selected so as to adjust the distribution of the polysiloxane units, and thus the transparency and haze of the composition.

The thermoplastic composition is formed in the presence of a compound capable of effecting the reaction described herein, that is, capable of producing a reaction product of a polyester polycarbonate and a polysiloxane polycarbonate that has excellent transparency and low haze optionally together with good melt flow properties and/or good ductility. Suitable compounds are certain transesterification catalysts, also known as redistribution catalysts, which have been used to redistribute the molecular weight distribution of polycarbonates by catalyzing chain scission reactions. Statistically, such chain scission reactions disproportionately affect the highest molecular weight species, so that a lower net molecular weight may be achieved. Without being bound by theory, it is believed that the most desirable results obtained herein, i.e., thermoplastic compositions having a high degree of optical transparency and low haze, together with a high melt flow rate (MVR) and ductility, may be the result of a transesterification reaction between combined copolymers, catalyzed by the presence of a transesterification catalyst. It is to be understood, however, that the term "transesterification catalyst" is used for convenience, and is not intended to be limiting as to the type of reaction(s) that may occur during the inventive process.

Suitable transesterification catalysts are numerous and include a wide variety of bases and Lewis acids. Specific transesterification catalysts within the scope of this disclosure, i.e. those which produce lower molecular weight species, efficient transesterification, and low residual monomer, include tetraorganophosphonium hydroxides, tetraorganophosphonium carbonates, tetraorganophosphonium acetate, tetraorganophosphonium phenolates, tetraorganophosphonium bisphenolates, tetraalkyl ammonium hydroxides, tetraalkyl ammonium carbonates, tetraalkyl ammonium phosphites, tetraalkyl ammonium acetates, tetraalkyl ammonium phenolates, tetraalkyl ammonium bisphenolates, and a mixture comprising one or more of these. More specifically, the transesterification catalyst is a tetra $C_1$-$C_{10}$ alkyl phosphonium hydroxide that is decomposable under reaction conditions to very low levels of the active catalytic species. Most specifically, the catalyst may be tetrabutylphosphonium hydroxide (TBPH), which may be present in amounts of 0.0005% to 0.1%, or from 5 to 1000 ppm of the total weight of the polymer blend. In one embodiment the amount of TBPH present in the polymer blend is 0.004 to 0.022%, or 40 to 220 ppm of the total weight. The catalyst is present in sufficient amount to catalyze the reaction to a sufficient degree to produce a transparent reaction product, but is not present in an excessive degree, where an excess of catalyst may produce an opaque reaction product. The optimal catalyst level will vary depending on the particular catalyst and can be determined by testing.

In addition to the polyester polycarbonate and polysiloxane polycarbonate described above, it is also possible to use combinations with other thermoplastic polymers, for example homopolycarbonates and/or homopolyesters. As used herein, a "combination" is inclusive of all mixtures, blends, alloys, and the like. Suitable polycarbonates include those having the structure of Formula (1), though other suitable polycarbonates may be copolymers with polyesters, polysiloxanes, polyalkylene glycols, polyolefins, poly (arylene ethers), and the like. In one embodiment, a polycarbonate is the condensation product of phosgene and a dihydroxy compound of Formula (6). A non-limiting example of a specific suitable polycarbonate is bisphenol-A polycarbonate. Suitable polyesters comprise repeating units of Formula (1), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition. When present, the additional polymer(s) may be used in an amount of 0.1 to 95 wt %, based on the total weight of the composition. Within this range, the polymer amount may be specifically at least 1 wt % to 75 wt %. Again, the type and amount of additional polymer should be selected such that the reaction product ultimately produced has the aforementioned optical properties.

The thermoplastic composition may further include an impact modifier composition comprising a particular combination of impact modifiers to increase its impact resistance. These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (i):

wherein each $X^b$ is independently hydrogen, $C_1$-$C_5$ alkyl, or the like. Examples of conjugated diene monomers that may be used are butadiene, isoprene, 1,3-heptadiene, methyl-1, 3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (ii):

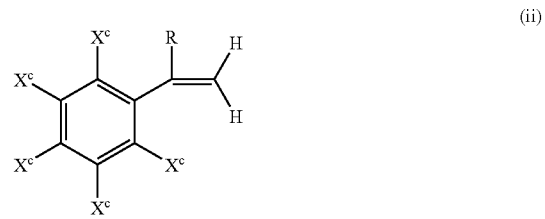

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (iii):

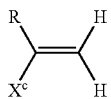

(iii)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth) acrylate, ethyl(meth)acrylate, n-butyl(meth)acrylate, t-butyl (meth)acrylate, n-propyl(meth)acrylate, isopropyl(meth) acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and th like, and combinations comprising at least one of the foregoing monomers. The $C_{1-8}$ alkyl(meth)acrylate monomers may optionally be polymerized in admixture with up to 15 wt. % of comonomers of formulas (i), (ii), or (iii). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber latices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (ii) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (iii). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth) acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impactmodifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co) polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (ii) or (iii), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methaacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as General Electric Company. In the practice, any of the above-described impact modifiers may be used providing it is free of the alkali metal salts of fatty acids, alkali metal carbonates and other basic materials.

A specific impact modifier of this type is an MBS impact modifier wherein the butadiene substrate is prepared using above-described sulfonates, sulfates, or phosphates as surfactants. It is also preferred that the impact modifier have a pH of about 3 to about 8, specifically about 4 to about 7.

The thermoplastic composition may also include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from combinations comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 90 parts by weight, based on 100 parts by weight of the reaction resin mixture (polyester polycarbonate, polysiloxane polycarbonate, and any impact modifier or other polymer component). The composition may also comprise at least one flame retardant, generally a halogenated material, an organic phosphate, or a combination of the two. For compositions containing poly(arylene ether) or polycarbonate resin, the organic phosphate class of materials are generally preferred. The organic phosphate is preferably an aromatic phosphate compound of the formula (iv):

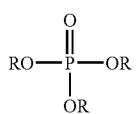

(iv)

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenylbisneopentyl phosphate, phenyl-bis (3,5,5'-tri-methyl-hexylphosphate), ethyldiphenyl phosphate, 2-ethyl-hexyldi(p-tolyl)phosphate, bis-(2-ethylhexyl)p-tolylphosphate, tritolyl phosphate, bis-(2-ethylhexyl)phenyl phosphate, tri-(nonylphenyl)phosphate, di(dodecyl)p-tolyl phosphate, tricresyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and the like. In one embodiment the phosphates is one in which each R is aryl or alkyl substituted aryl.

Alternatively, the organic phosphate can be a di- or polyfunctional compound or polymer having the formula (v), (vi), or (vii) below:

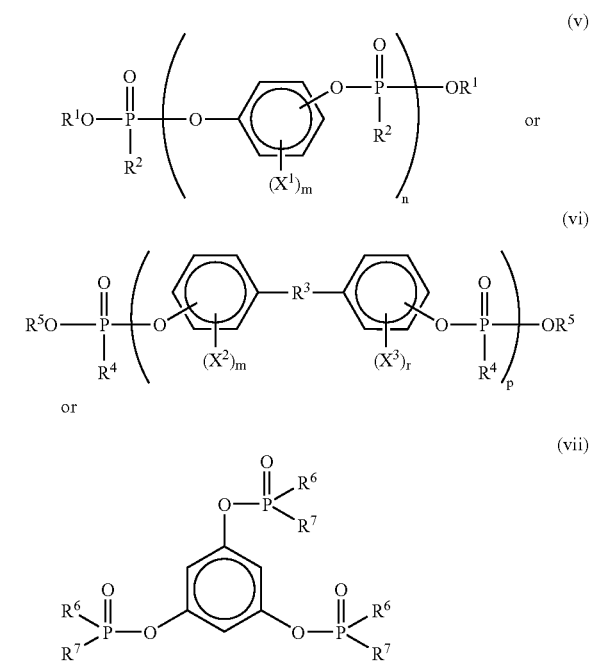

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another group of useful flame retardants include certain cyclic phosphates, for example, diphenyl pentaerythritol diphosphate, as a flame retardant agent for poly(arylene ether) resins, as is described by Axelrod in U.S. Pat. No. 4,154,775.

Particularly useful organic phosphates include phosphates containing substituted phenyl groups, phosphates based upon resorcinol such as, for example, resorcinol tetraphenyl diphosphate, as well as those based upon bis-phenols such as, for example, bis-phenol A tetraphenyl diphosphate. In one embodiment, the organic phosphate is selected from the group consisting of butylated triphenyl phosphate, resorcinol diphosphate, bis-phenol A diphosphate, triphenyl phosphate, isopropylated triphenyl phosphate and mixtures of two or more of the foregoing.

Also suitable as flame-retardant additives for this invention are the phosphoramides of the formula (viii):

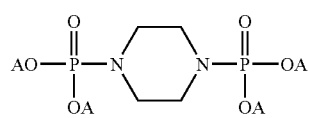

(viii)

wherein each A moiety is a 2,6-dimethylphenyl moiety or a 2,4,6-trimethylphenyl moiety. These phosphoramides are piperazine-type phosphoramides. These additives are known in the art and have been described in Talley, *J. Chem. Eng. Data*, 33, 221-222 (1988). When polyamide resins are used as part of the composition, these piperazine-type phosphoramides are especially useful as they are believed to have less interactions with the polyamides then the organo-ester type phosphates.

The flame retardant is present in at least the minimum amount necessary to impart a degree of flame retardancy to the composition to pass the desired UL-94 protocol. The particular amount will vary, depending on the molecular weight of the organic phosphate, the amount of the flammable resin present and possibly other normally flammable ingredients which might also be included in the composition.

Halogenated materials are also a useful class of flame retardants. These materials are preferably aromatic halogen compounds and resins of the formula (ix):

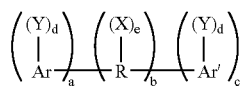

(ix)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of either oxygen ether; carbonyl; amine; a sulfur containing linkage, e.g., sulfide, sulfoxide, sulfone; a phosphorus containing linkage; etc. R can also consist of two or more alkylene or alkylidene linkages connected by such groups as aromatic, amino, ether, carbonyl, sulfide, sulfoxide, sulfone, a phosphorus containing linkage, etc. Other groups which are represented by R will occur to those skilled in the art, including those found in U.S. Pat. Nos. 4,692,490 and 4,191,685.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc; aryl groups, such as phenyl, naphthyl, biphenyl, xylyl, tolyl, etc; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dichromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane 2,2 bis-(3-bromo-4-hydroxyphenyl)-propane.

The preparation of these and other applicable bisphenols is known in the art. They are most commonly prepared by condensation of two moles of a phenol with a single mole of a ketone or aldehyde. In place of the divalent aliphatic group in the above examples may be substituted oxygen, sulfur, sulfoxy, etc.

Included within the above structural formula are: 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

The composition also optionally includes an anti-drip agent such as a fluoropolymer. The fluoropolymer may be a fibril forming or non-fibril forming fluoropolymer. The fluoropolymer generally used is a fibril forming polymer. In some embodiments the fluoropolymer comprises polytetrafluoroethylene. In some embodiments an encapsulated fluoropolymer may be employed i.e. a fluoropolymer encapsulated in a polymer. An encapsulated fluoropolymer may be made by polymerizing the polymer in the presence of the fluoropolymer. Alternatively, the fluoropolymer may be preblended in some manner with a second polymer, such as for, example, an aromatic polycarbonate resin or a styreneacrylonitrile resin as in, for example, U.S. Pat. Nos. 5,521, 230 and 4,579,906 to form an agglomerated material for use as an anti-drip agent. Either method may be used to produce an encapsulated fluoropolymer.

The anti-drip agent, when present, comprises 0.1 to 5 weight percent, more specifically 0.5 to 3.0 weight percent and most specifically 1.0 to 2.5 weight percent based on the total weight of the composition without reinforcing agent.

Suitable antioxidant additives include, for example, organophosphites such as tris(nonylphenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 parts by weight, based on 100 parts by weight of reaction resin mixture.

Suitable thermal (heat) stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 parts by weight, based on 100 parts by weight of reaction resin mixture.

Light stabilizers and/or ultraviolent light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 parts by weight, based on 100 parts by weight of reaction resin mixture.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers are generally used in amounts of 0.0001 to 1 parts by weight, based on 100 parts by weight of reaction resin mixture.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates suc as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic non-ionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of 0.0001 to 1 parts by weight, based on 100 parts by weight of the reaction resin mixture.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, perfluorinated sulfonate salts such as tetra-n-butylphosphonium perfluorobutylsulfonate, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol units polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of 0.0001 to 5 parts by weight, based on 100 parts by weight of the reaction resin mixture.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of 0.01 to 10 parts by weight, based on 100 parts by weight of reaction resin mixture.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5, 3"",5""-tetra-t-butyl-p-quinquephenyl; 2,5-diphenylfuran;

2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylene-bis(5-phenyloxazole); rhodamine 700; rhodamine 800; pyrene; chrysene; rubrene; coronene, or the like, or combinations comprising at least one of the foregoing dyes. Dyes are generally used in amounts of 0.01 to 10 parts by weight, based on 100 parts by weight of reaction resin mixture.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol(hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group (—CH$_2$OH) or it may be a member of a more complex hydrocarbon group such as would be the case with (—CR$^4$HOH) or (—CR$_2^4$OH) wherein R$^4$ is a complex or a simply hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol. Gamma-radiation stabilizing compounds are typically used in amounts of 0.001 to 1 wt %, more specifically 0.01 to 0.5 wt %, based on the total weight of the reaction resin mixture.

Blends of polyester polycarbonates with polysiloxane polycarbonates with a pigment or color package are of commercial interest due to the inherent ductility of polysiloxane polycarbonates and the improved weatherability of materials derived from polyester polycarbonates. It is also well-known in the art that polyacrylic impact modifiers have a tendency to cause problems in the conditions required to mold polycarbonate; however polysiloxane polycarbonates may be used as an impact modifier to solve this type of problem. Polyacrylic impact modifiers are known to cause a loss in the gloss of polycarbonate materials after UV exposure due to the domain size of the polyacrylate. However, by substituting polysiloxane polycarbonates as the impact modifier, this problem may also be alleviated.

The polyester polycarbonate may be combined with the polysiloxane polycarbonate copolymer in proportions suitable to provide the desired properties of melt flow and ductility. In one embodiment, the thermoplastic composition comprises 1 to 99 wt % of the polyester polycarbonate resin; 99 to 1 wt % of the polysiloxane polycarbonate; and 40 to 220 ppm of the transesterification catalyst. More particularly, the thermoplastic composition comprises 20 to 90 wt % of the polyester polycarbonate resin; 80 to 10 wt % of the polysiloxane polycarbonate; and 70 to 200 ppm of the transesterification catalyst. In another embodiment, the thermoplastic composition consists essentially of 1 to 99 wt % of the polyester polycarbonate resin; 99 to 1 wt % of the polysiloxane polycarbonate; and 40 to 220 ppm of the transesterification catalyst. In another embodiment, the thermoplastic composition consists of 1 to 99 wt % of the polyester polycarbonate resin; 99 to 1 wt % of the polysiloxane polycarbonate; and 40 to 220 ppm of the transesterification catalyst. In a further embodiment, the thermoplastic composition consists essentially of 1 to 99 wt % of the polyester polycarbonate resin; 1 to 99 wt % of the polysiloxane polycarbonate, 1 to 99 wt % of a polycarbonate; and 40 to 220 ppm of the transesterification catalyst. In a further embodiment, the thermoplastic composition consists of 1 to 99 wt % of the polyester polycarbonate resin; 1 to 99 wt % of the polysiloxane polycarbonate, 1 to 99 wt % of a polycarbonate; and 40 to 220 ppm of the transesterification catalyst. All of the foregoing values are based on the combined weight of the polyester polycarbonate resin, the polysiloxane polycarbonate resin, and the transesterification catalyst, exclusive of other polymers, additives or fillers, unless otherwise specified, and the combined weight percentage of all specified components may not exceed 100 wt %.

A specific embodiment is a thermoplastic composition comprising the reaction product of a mixture comprising 20 to 90 wt % of a polyester polycarbonate comprising repeating ester units of formula (15)

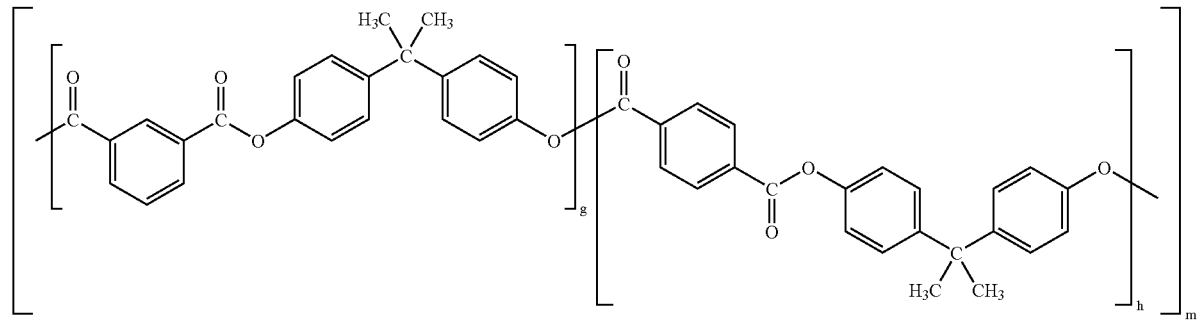

(15)

wherein the molar ratio of isophthalate containing units g to terephthalate units h is 99:1 to 1:99, more specifically 98:2 to 40:60, and repeatable carbonate units of formula (16):

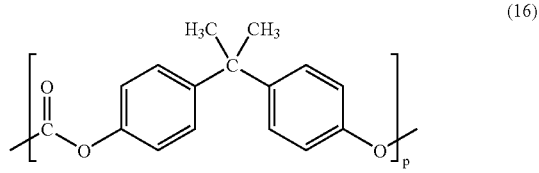

(16)

wherein the molar ratio of the ester units m to the carbonate units p is 99:1 to 1:99, specifically 95:5 to 30:70. It should be noted that the structure of the repeatable carbonate unit of formula (16) has been modified so as to reflect the connectivity of the carbonate units with the other copolymer units. The reaction mixture further comprises 80 to 10 wt % of a polysiloxane polycarbonate copolymer comprising repeatable polysiloxane units of formula (17):

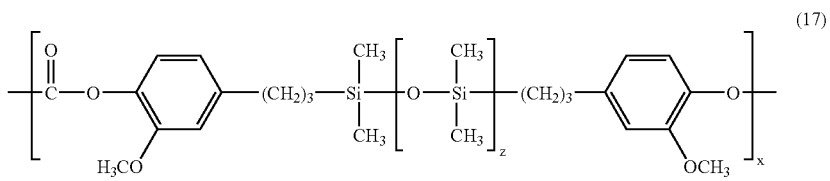

(17)

wherein z is 5 to 100, and repeatable carbonate units of formula (18):

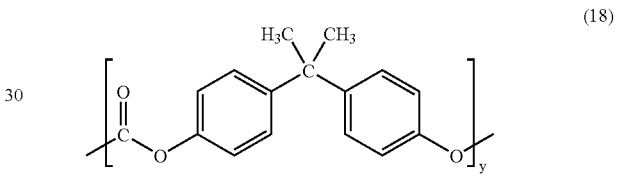

(18)

wherein the weight ratio polysiloxane units x to carbonate units y is 1:99 to30:70, more specifically 2:98 to 25:75, and the polysiloxane polycarbonate copolymer has a haze of less than or equal to 30%, measured according to ASTM D1003-00 at a thickness of 3.2 millimeters. The structures of the repeatable carbonate unit of formula (18) and the polysiloxane unit (17) has been modified so as to reflect the connectivity of the carbonate units with the other copolymer units. The reaction mixture also comprises as a catalyst tetrabutyl phosphonium hydroxide present at 40 to 200 ppm, based on the total weight of all of the copolymers.

Another specific embodiment is a thermoplastic composition comprising the reaction product of a combination comprising 20 to 90 wt % of a polyester polycarbonate comprising repeating ester units of formula (19)

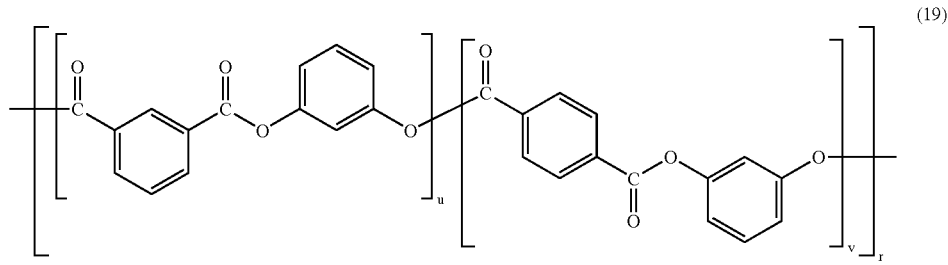

(19)

wherein the molar ratio of isophthalate units u to terephthalate units v is 99:1 to 1:99, more specifically 98:2 to 40:60, and repeatable polycarbonate units of formulas (20) and (21):

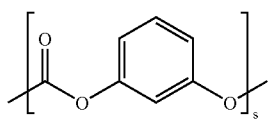
(20)

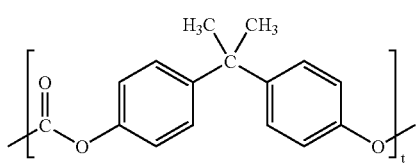
(21)

wherein the mole % r of the repeating ester unit (18) is 1 to 99, specifically 10 to 70, the mole % s of the repeatable carbonate unit (20) is 1 to 99%, specifically 2 to 90%, and the mole % t of the repeatable carbonate unit (21) is 1 to 99%, specifically 40 to 98%, wherein r+s+t equals 100. It should be noted that the structure of the repeatable carbonate units of formulas (20) and (21) have been modified so as to reflect the connectivity of the carbonate units with the other copolymer units. The composition further comprises 80 to 10 wt % of a polysiloxane polycarbonate copolymer comprising repeatable polysiloxane unit (16) and repeatable carbonate unit (17), wherein the weight ratio of polysiloxane units x to carbonate units y is 1:99 to 30:70, specifically 2:98 to 25:75, and the polysiloxane polycarbonate copolymer has a haze of less than or equal to 30%, measured according to ASTM D1003-00 at a thickness of 3.2 millimeters; and wherein the catalyst is tetrabutyl phosphonium hydroxide present at 40 to 220 ppm, all based on the total weight of the copolymers.

The thermoplastic compositions may be manufactured by methods generally available in the art, for example, in one embodiment, in one manner of proceeding, powdered polyester polycarbonate, powdered polysiloxane polycarbonate, and/or other optional components are first combined in a Henschel high speed mixer. Other low shear processes including but not limited to hand mixing may also accomplish this blending. The blend is then fed into the throat or feedthroat of a twin-screw extruder via a hopper. Alternatively, one or more of the components may be incorporated into the composition by feeding directly into the extruder at the throat and/or downstream through a sidestuffer or feedport. Such additives may also be compounded into a masterbatch with a desired polymeric resin and fed into the extruder. The extruder is generally operated at a temperature higher than that necessary to cause the composition to flow. The catalyst is also fed as an aqueous solution concomitantly down the throat of the extruder. The catalyst may be fed using a metering pump or by a calibrated gravity fed drip. The catalyst may also be blended with the polyester polycarbonate and polysiloxane polycarbonate copolymer powders in a mixer prior to extrusion. The catalyst may be diluted in water from a concentration of 50 to 1 wt % catalyst in water. The extrudate is immediately quenched in a water batch and pelletized. The pellets, so prepared, when cutting the extrudate may be one-fourth inch long or less as desired. Such pellets may be used for subsequent molding, shaping, or forming.

Other embodiments include articles comprising any of the above-described compositions. For example, the article may comprise a film, sheet, molded object, membrane, or composite, wherein the film, sheet, molded object, or composite has at least one layer comprising the composition. Compositions of the invention may be converted to articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, lubricity, and biocompatibility. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt, or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (1) Providing a single or multi-layer thermoplastic substrate having optionally one or more colors on the surface, for instance, using screen printing or a transfer dye; (2) Conforming the substrate to a mold configuration such as by forming and trimming a substrate into a three dimensional shape and fitting the substrate into a mold having a surface which matches the three dimensional shape of the substrate; (3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

It has been observed that upon forming a combination of a polysiloxane polycarbonate copolymer and a polyester polycarbonate copolymer, the polysiloxane units may aggregate to form discrete polysiloxane-containing domains (hereinafter, "domains"). The domains may be 20 to 200 nanometers in continuous length. Absent a mechanism to prevent, minimize, or mitigate their aggregation, the domains have further been observed to form agglomerations of domains (hereinafter, "agglomerations"). The formation of both domains and agglomerations may be observed by appropriate analytical methods such as transmission electron microscopy (TEM).

Without being bound by theory, it is believed that the presence of these agglomerations in the combination leads to scattering of incident light, wherein larger agglomerates and greater numbers of agglomerations may each individually scatter increased amounts of incident light. It is further hypothesized that domains greater than 200 nm in length, and increasing numbers of domains may each individually serve to increase the scattering of incident light. Thus, smaller domains and smaller agglomerations, and decreased numbers of each of these, may decrease the amount of scattered incident light, and thereby both increase the transmission and decrease the haze of the combination.

Use of a transesterification catalyst is believed to substantially mitigate or prevent agglomerations from forming. Accordingly, in one embodiment, a reaction product of a polyester polycarbonate and a polysiloxane polycarbonate in the presence of a transesterification catalyst as described above is substantially free of agglomerations. In another embodiment, the reaction product is substantially free of agglomerations that result in compositions having a haze of greater than 30%. In still another embodiment, no more than 10% of domains will have a distance between any two domains of less than 10 nanometers. Alternatively, no more than 8% of domains, more specifically no more than 5% of domains, still more specifically no more than 2% of domains, and most specifically no more than 1% of domains will have a distance between any two domains of less than 10 nanometers.

It has further been observed that the agglomerations may be characterized by a substantially parallel structure. In this structure the agglomerations may include two or more domains, wherein the observed interval separating parallel structures in the domains is in proportion to the shortest dimension of the individual domains. In one embodiment, the interval separating any two domains may be 0.5 to 1.5 times the shortest dimension of the domains, more specifically 0.75 to 1.25 times the shortest dimension of the domains. Further, the dimensions of the agglomerations of domains have been observed to be 0.05 to 2 micrometers, more specifically from 0.07 to 1.5 micrometers in contiguous length. In another embodiment, no more than 10% of domains will be agglomerated into domains of 0.05 to 2 micrometers in contiguous length. Alternatively, no more than 8% of domains, more specifically no more than 5% of domains, still more specifically no more than 2% of domains, and most specifically no more than 1% of domains will be agglomerated into domains of 0.05 to 2 micrometers in contiguous length.

In one embodiment, the composition (or articles prepared therefrom) may exhibit one or more of the following desirable properties: a percent transmission of at least 60%, more specifically at least 70%, measured according to ASTM D1003-00 at a thickness of 3.2 millimeters; a percent haze of less than or equal to 30%, specifically less than or equal to 25%, more specifically less than or equal to 20%, measured according to ASTM D1003-00 at a thickness of 3.2 millimeters; a melt volume ratio (MVR) of 1 to 40, more specifically 2 to 25 $cm^3$/10 minutes, measured at 300° C. and 1.2 kg in accordance with ISO 1133. The polycarbonate compositions may further have a heat deformation temperature (HDT) of 110 to 170° C., more specifically 145 to 160° C., measured at 66 psi according to ISO 179, and a notched Izod impact strength of 4 to 8 Joules per centimeter (J/cm), more specifically at least 5 to 7 J/cm, measured according to ASTM D256-04 at 23° C. The polycarbonate compositions may further have a % tensile elongation of 30 to 120%, or specifically 60 to 115%, measured in accordance with ASTM D256-04.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like.

Other representative weatherable articles that may be fabricated using the thermoplastic compositions provided herein include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses;

ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. Additional fabrication operations may be performed on articles, such as, but not limited to molding, in-mold decoration, baking in a paint oven, lamination, and/or thermoforming.

EXAMPLES

All compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on an Husky or BOY injection molding machine. Compositions are compounded and molded at a temperature range of 285-330° C., though it will be recognized by one skilled in the art that the method may not be limited to these temperatures.

The compositions are tested for the following properties: Haze (%) and/or transmittance (%) were determined according to ASTM D1003-00 using a Gardner Haze Guard Dual, on 3.2 or 1.6 millimeter thick molded plaques. Izod Notched Impact strength and % ductility were measured according to ISO 180-1A on 4 and 3.12 millimeter thick test bars and at various temperatures (see ASTM D256-04 for NI testing at 23° C.). Melt Volume rate, MVR, was tested according to ISO 1133 at 300° C. for 6 and 18 minutes using a weight of 1.2 kilograms (see also ASTM 1238-04). Heat deformation temperature (HDT) was determined on one-eighth inch (3.12 mm) bars at 66 psi according to ISO 137. Weatherability was tested on one-eighth inch (3.2 mm) molded plaques according to ASTM G26, which is covered by the general method described in ASTM G155.

The thermoplastic composition is further illustrated by the following non-limiting examples, which use the following components. The blending experiments described below were performed using polysiloxane polycarbonate I (also referred to as "PSC");

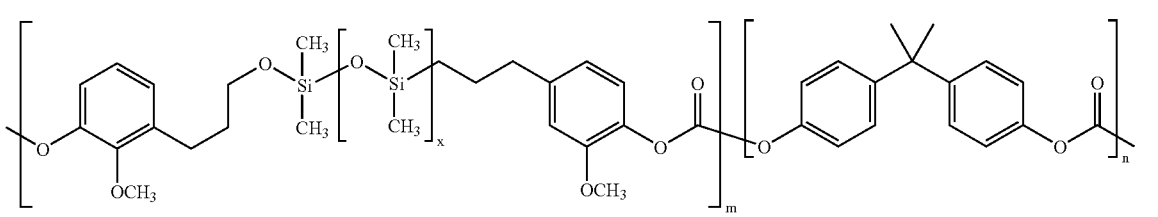

(I)

wherein the proportion by weight of polycarbonate unit n is 94 wt % and the polysiloxane unit m is 6 wt %; polyester polycarbonate II (also referred to as PEC-II);

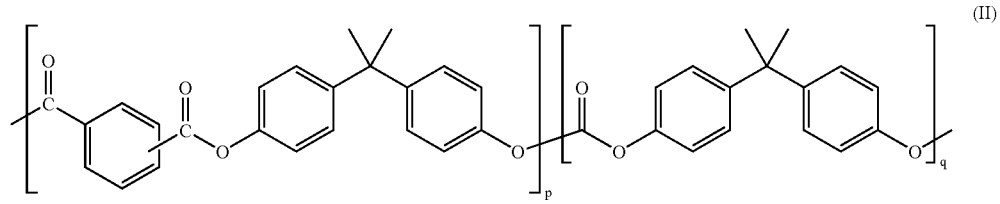

(II)

wherein the isomeric composition of polyester unit p is 93 mol % isophthalate-bisphenol A and 7 mol % terephthalate-bisphenol A, and the molar ratio of polyester unit p to carbonate unit q is 76:24; and polyester polycarbonate III (also referred to as PEC-III);

wherein the isomeric composition of polyester unit p is 93 mol % isophthalate-bisphenol A and 7 mol % terephthalate-bisphenol A, and the molar ratio of polyester unit p to carbonate unit q is 76:24; and polyester polycarbonate III (also refelTed to as PEC-III);

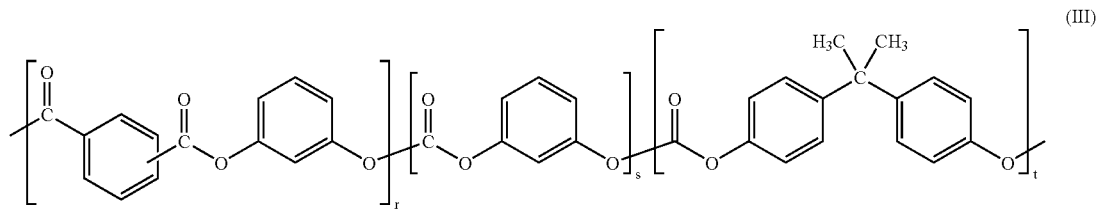

wherein the isomeric composition of polyester unit r is 50 mol % isophthalate-resorcinol and 50 mol % terephthalate-resorcinol, and wherein the mole-% of polyester unit r resorcinol-carbonate s, and bisphenol A carbonate t, or r:s:t, in the compositions maybe 19:6:75, 51:15:34, or 81:10:9. Transesterification catalyst loadings for the examples use a 40% aqueous solution of tetrabutylphosphonium hydroxide at 80 or 160 ppm loading.

Example 1

The following formulation was combined and extruded on a twin-screw extruder: (A) II (3000 g); (B) I (2000 g); (C) tetrabutylphosphonium hydroxide 1.0 g of a 40 wt % solution of TBPH in $H_2O$; for 80 ppm added catalyst).

Example 2

The following formulation was combined and extruded on a twin-screw extruder: (A) II (2500 g); (B) I (2500 g); (C) tetrabutylphosphonium hydroxide (1.0 g of a 40 wt % solution of TBPH in $H_2O$; for 80 ppm added catalyst).

Example 3

The following formulation was combined and extruded on a twin-screw extruder: (A) II (2000 g); (B) I (3000 g); (C) tetrabutylphosphonium hydroxide (1.0 g of a 40 wt % solution of TBPH in $H_2O$; for 80 ppm added catalyst).

Example 4

The following formulation was combined and extruded on a twin-screw extruder: (A) II (2000 g); (B) I (3000 g); (C) tetrabutylphosphonium hydroxide (2.0 g of a 40 wt % solution of TBPH in $H_2O$; for 160 ppm added catalyst).

Example 5

The following formulation was combined and extruded on a twin-screw extruder: (A) II (3500 g); (B) I (1500 g); (C) tetrabutylphosphonium hydroxide (1.0 g of a 40 wt % solution of TBPH in $H_2O$; for 80 ppm added catalyst).

Example 6

The following formulation was combined and extruded on a twin-screw extruder: (A) II (3500 g); (B) I (1500 g); (C) tetrabutylphosphonium hydroxide (2.0 g of a 40 wt % solution of TBPH in $H_2O$; for 160 ppm added catalyst).

Example 7

The following formulation was combined and extruded on a twin-screw extruder: (A) III, wherein r:s:t is approximately 51:15:34 (2500 g); (B) I (2500 g); (C) tetrabutylphosphonium hydroxide (1.0 g of a 40 wt % solution in $H_2O$; or 80 ppm added catalyst).

Example 8

The following formulation was blended and extruded on a twin-screw extruder: (A) I (2500 g); (B) III, wherein r:s:t is approximately 51:15:34 (1350 g); (C) III, wherein r:s:t is approximately 19:6:75 (1150 g); (D) tetrabutylphosphonium hydroxide 2.0 g of a 40 wt % solution in $H_2O$; or 160 ppm added catalyst); (E) phosphite stabilizer (1.5 g); (F) pentaerythritol tetrastearate (15 g).

Example 9

The following formulation was combined and extruded on a twin-screw extruder: (A) I (2500 g); (B) III, wherein r:s:t is approximately 51:15:34 (1350 g); (C) III, wherein r:s:t is approximately 19:6:75 (1150 g); (D) tetrabutylphosphonium hydroxide (2.0 g of a 40 wt % solution in $H_2O$; or 160 ppm added catalyst); (E) phosphite stabilizer (1.5 g); (F) pentaerythritol tetrastearate (15 g); (G) pigment black (11 g).

Comparative Example 1

The following formulation was combined and extruded on a twin-screw extruder: (A) II (2500 g); (B) I (2500 g).

Comparative Example 2

The following formulation was combined and extruded on a twin-screw extruder: (A) II (3000 g); (B) I (2000 g).

Comparative Example 3

The following formulation was combined and extruded on a twin-screw extruder: (A) II (2000 g); (B) I (3000 g).

Comparative Example 4

The following formulation was combined and extruded on a twin-screw extruder: (A) II (3500 g); (B) I (1500 g).

Comparative Example 5

The following formulation was blended and extruded on a twin-screw extruder: (A) III, wherein r:s:t is approximately 51:15:34 (2500 g); (B) I (2500 g).

Comparative Example 6

The following formulation was blended and extruded on a twin-screw extruder: (A) III, wherein r:s:t is approximately 19:6:75 (5000 g); (B) phosphite stabilizer (1.5 g); (C) pentaerythritol tetrastearate (15 g); (D) pigment black (11 g); (E) Paraloid 9035XP modifier, acrylic impact modifier made by Rohm and Haas (125 g).

Comparative Example 7

The following formulation was blended and extruded on a twin-screw extruder: (A) I (2500 g); (B) III, wherein r:s:t is approximately 51:15:34 (1350 g); (C) II, wherein r:s:t is approximately 19:6:75 (1150 g); (D) phosphite stabilizer (1.5 g); (E) pentaerythritol tetrastearate (15 g).

Comparative Example 8

The following formulation was blended and extruded on a twin-screw extruder: (A) I (2500 g); (B) III, wherein r:s:t is approximately 51:15:34 (1350 g); (C) III, wherein r:s:t is approximately 19:6:75 (1150 g); (D) phosphite stabilizer (1.5 g); (E) pentaerythritol tetrastearate (15 g); (F) pigment black (11 g).

TABLE Ia

Data for Examples 1-6.

| | Example 1 | Example 2 | Example 3 | Example 4 | Example 5 | Example 6 |
|---|---|---|---|---|---|---|
| Haze | 18.4 | 18.7 | 17.7 | 12.7 | 15.6 | 7.6 |
| Tg (° C.) | 167 | 163 | 160 | 159 | 171 | 171 |
| HDT@ 66 psi (° C.) | 155 | 151 | 147.3 | 146.3 | 158.7 | 157.5 |
| NI impact @ 23° C. (ft-lb/in) | 12.3 | 12 | 13.3 | 12 | 12.1 | 11.4 |
| NI impact after 20 h. @ 121° C., 100% humidity (ft-lb/in) | 8.4 | 8.9 | 8.4 | 9.5 | 4.1 | 5.3 |
| Melt Volume Rate (MVR) @ 300° C. (cm³/10 min.) | 3.03 | 3.88 | 4.91 | 6.76 | 2.34 | 2.88 |
| Melt Volume Rate (MVR) @ 300° C. after 10 days @ 80° C., 80% humidity (cm³/10 min. | 3.07 | 4.44 | 5.85 | 6.9 | 3.02 | 3.82 |
| % Elongation @ break | 80.8 | 92.9 | 87.4 | 110.2 | 34.4 | 92.4 |

TABLE Ib

Data for Comparative Examples 1-4.

| | Comp. Example 1 | Comp. Example 2 | Comp. Example 3 | Comp Example 4 |
|---|---|---|---|---|
| Haze | 62.1 | 52.1 | 70.3 | 72.2 |
| Tg (° C.) | 164 | 172 | 161 | 171 |
| HDT@ 66 psi (° C.) | 150 | 156 | 149 | 159.6 |

TABLE Ib-continued

Data for Comparative Examples 1-4.

| | Comp. Example 1 | Comp. Example 2 | Comp. Example 3 | Comp Example 4 |
|---|---|---|---|---|
| NI impact @ 23° C. (ft-lb/in) | 11.5 | 11.3 | 10.9 | 11.8 |
| NI impact after 20 h. @ 121° C., 100% humidity (ft-lb/in) | 10.4 | 9.6 | 10.3 | 7 |
| Melt Volume Rate (MVR) @ 300° C. (cm³/10 min.) | 3.32 | 2.24 | 3.35 | 1.99 |
| Melt Volume Rate (MVR) @ 300° C. after 10 days @80° C., 80% humidity (cm³/10 min. | 3.75 | 2.31 | 3.98 | 2.57 |
| % Elongation @ break | 88.2 | 67.5 | 92.8 | 68.3 |

Addition of the transesterification catalyst, tetrabutylphosphonium hydroxide or TBPH, greatly reduces the haze in the combinations of I with II or III. In Table 1a., the materials processed in the presence of TBPH are transparent in appearance, while the combination processed in the absence of TBPH is virtually opaque. The glass transition temperature (Tg) and the Heat Distortion Temperature (HDT) of the combination of I and II with (Examples 1-6) and without TBPH (Comparative Examples 1-4, from Table 1b) are nearly identical, but there is a slight decrease of both properties when the materials are redistributed with the TBPH catalyst. The Notched Izod (NI) impact strength is initially the same after molding; however, the combinations without TBPH have a slightly higher NI impact strength than the combinations with TBPH. There was a significant increase in the melt flow of the trans-esterified compositions of I and II. While not wishing to be bound by theory, because the catalyst was introduced into the extruder as an aqueous solution, it is believed that some hydrolysis of the polymer chains was taking place during catalytic transesterification, leading to the higher melt flow rates.

The % elongation before break data (Table 1a) indicates increasing elongation with increasing weight loadings of I relative to II, up to 50 wt % of I. Experiments 5, 1, 2, and 3 respectively have loadings of I of 30, 40, 50, and 60 wt %, and show an increasing trend in % elongation of 34.4, 80.8, 92.9, and 87.4%, wherein the highest loading of 60 wt % I appears to show a plateau or slightly decreased performance from the peak at 50 wt % I. In addition, a comparison of % elongation for the same compositions with increasing trans-esterification catalyst loading shows greater % elongation with increasing catalyst. Samples 5 and 6, with 80 to 160 ppm catalyst respectively and each with 30 wt % I, show a significant increase in % elongation of, respectively, 34.4 to 92.4%. In addition, samples 3 and 4, with 80 to 160 ppm catalyst respectively and each with 60 wt % I, show a significant increase in % elongation of, respectively, 87.4 to 110.2%.

TABLE 2

| Sample ID | Example 7 | Example 8 | Comp. Ex. 5 | Comp. Ex. 7 |
|---|---|---|---|---|
| Haze (%) | 14.3 | 24.9 | 100 | 100 |
| Tg (deg. C) | 142 | 137 | 143 | 138 |
| Melt Flow @ 300° C. (g/10 min) | 12.26 | 25.52 | 8.61 | 9.69 |
| Notched Izod impact @ 23° C. (ft-lbs/in); % Ductility | 14.7; 100 | 14.0; 100 | 13.7; 100 | 14.6; 100 |
| Notched Izod impact @ 0° C. (ft-lbs/in); % Ductility | 13.6; 100 | 9.83; 100 | 11.9; 100 | 10.8; 100 |
| Notched Izod impact @ −20° C. (ft-lbs/in); % Ductility | 12.0; 100 | 10.4; 60 | 10.8; 80 | 12.4; 100 |
| Notched Izod impact @ −30° C. (ft-lbs/in); % Ductility | 11.6; 100 | 7.41; 100 | 9.9; 100 | 11.3; 100 |

In Table 2, in a comparison of high-polyester content compositions (III, wherein r:s:t is 51:15:34) with and without catalyst, improved low temperature Notched Izod impact strength performance was seen down to −30° C. for Example 7 (with 80 ppm catalyst) over Comparative Example 5 (without catalyst). In a comparison of low-polyester content compositions (III, wherein r:s:t is 19:6:75) containing mold-release agent (pentaerythritol tetrastearate), and with and without catalyst, decreased low temperature Notched Izod impact strength performance was seen down to −30° C. for Example 8 (with 80 ppm catalyst) over Comparative Example 7 (without catalyst). The Melt Volume Rate (MVR) of the redistributed polymers (Examples 1-6 from Table 1a, Examples 7 and 8 from Table 2) is slightly higher than for the Comparative Examples 1-5 and 8).

$^{31}$P NMR analysis of Examples 1-6 showed formation of free phenol end groups. The presence of the $^{31}$P resonance signal indirectly indicates the chain scission reaction of carbonate linkages (possibly leading to some hydrolysis), by the presence of the phosphonium salts of the phenolic end groups in direct proportion with the TBPH-catalyst level. The polymers were stable in the melt at 300° C. for extended periods of time. No formation of free-carboxylic acid endgroups was observed irrespective of catalyst loading, thus phenyl ester functionality is minimally affected by the TBPH-catalyst loading as processed in the extruder under the test conditions.

TEM Comparison of Example 6 (prepared using catalyst) and Comparative Example 4 (prepared without catalyst) was also performed. Transmission electron microscopy (TEM) imaging of extruder combined PEC II-PSC was performed to compare morphological features of extruded materials prepared with and without catalyst. Samples for TEM observation were prepared by cutting, blocking and facing of samples on a Leica UCT ultramicrotome. Final microtomy of 100 nm sections was performed at room temperature on the Leica UCT. The sections were stained with RuO4 solution for 2 min. The samples were viewed at 66,000× magnification.

Figure 2:
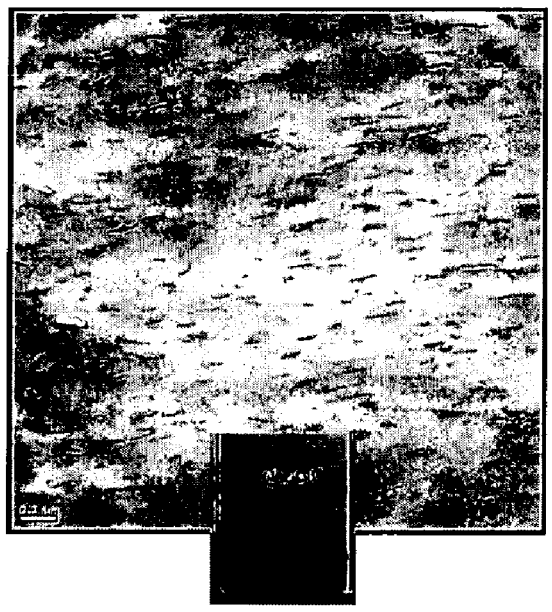
FIG. 2 is a TEM image of a blend of a polyester polycarbonate with a polysiloxane polycarbonate prepared with a transesterification catalyst.

The catalyst level and the PEC II-PSC ratio significantly affects the optical properties of the materials. As mentioned above, PEC II and PSC are immiscible materials; however, upon blending 70 wt % PEC 1, 30wt % PSC, with 160 ppm of trans-esterification catalyst (TBPH), the materials become miscible. FIG. 1 displays a TEM image of a 70:30 wt % ratio of PEC II to PSC without added catalyst. FIG. 2 displays a TEM image of a 70:30 wt % ratio of PEC II to PSC with added catalyst.

The TEM micrograph displayed in FIG. 1 (no catalyst-opaque) shows essentially no evidence of two-phase separation between the polyester polycarbonate and the polysiloxane polycarbonate, though the siloxane domains (dark regions in the TEM images of 15 to 20 nm in size) are apparent and not evenly dispersed throughout the entire sample. The circle placed in FIG. 1 captures the appearance of several siloxane-rich domains clustered together. In FIG. 2, the TEM of the copolymer blend prepared with catalyst, is visually transparent, and has low haze. The siloxane domains are dispersed more evenly throughout the sample in FIG. 2, and also appear to be larger, with the size of the siloxane domains measured to be 30-90 nm.

Addition of the transesterification catalyst, TBPH, greatly reduces the haze in PEC-PSC compositions. The materials that are transesterified are transparent in appearance, while the blends are virtually opaque (haze=100%). While not wishing to be bound by theory, the two phenomena may be explained by the following statements: 1) that the trans-esterification catalyst makes the immiscible polysiloxane segments of the polysiloxane polycarbonate more compatible with the polyester polycarbonate, and hence more transparent; and, in an opposing mechanism, 2) that the trans-esterification catalyst aids in the formation of larger siloxane domains. Generally, aggregation of the polysiloxanes is likely responsible for the opacity and increased haze of the blend, and wherein the opacity and haze may increase with higher levels of PSC. Thus, the balance between catalyst level and PSC polymer loading may define the transparency and haze of an extruded polymer blend.

With formation of more "active" moieties (phenol groups) in the final trans-esterified material, the rheology, melt stability, and hydrolytic stability of Example 7 and Comparative Example 5 were examined. Table 3 displays the viscosity data for these examples.

TABLE 3

| Sample ID | Example 7 | Comparative Example 5 |
|---|---|---|
| Stability @ 300° C./30 min (% wt. loss) | 0.6 | 0.5 |
| η@ 300° C./30 min. (% η loss) | −4.9 | −10 |
| Melt Flow @ 300° C. for 6 min. (g/10 min.) | 12.26 | 8.61 |
| Melt Flow @ 300° C. for 18 min. (g/10 min.) | 10.42 | 8.95 |
| Melt Flow @ 300° C. for 6 min. (g/10 min.) | 15.48 | 9.7 |

*Melt viscosity data after hydrolytic aging at 80° C. and 80% humidity for 30 days.

The rheological properties of the materials were measured. The materials showed insignificant changes in melt viscosity at 300° C. for 30 minutes under low shear (10 rad/sec), and the materials displayed shear-thinning behavior at higher shear rates. The copolymers displayed less of a viscosity drop at 300° C. for 30 minutes under low shear (10 rad/sec) than the regular blend. The hydrolytic stability of extruded pellets was studied after aging for 30 days in an oven at 80° C. and 80% humidity. The copolymer of I and III (wherein r:s:t is approximately 51:15:34) from Example 7 displayed a slight increase in melt flow (18% increase) compared to a 8% increase in melt flow from the opaque blend of I and III (wherein r:s:t is approximately 51:15:34) from Comparative Example 5.

Table 44 displays the mechanical and optical properties of copolymers and blends (Ex. 9, Comp. Ex. 8) of I and III (a 54:46 blend of III wherein r:s:t is 51:15:34 and III wherein r:s:t is 19:6:75) containing pigment black, versus III (wherein r:s:t is 51:15:34) with added acrylic impact modifier (Comp. Ex. 6).

TABLE 4

| Sample | Example 9 | Comparative Example 6 | Comparative Example 8 |
|---|---|---|---|
| Gate Blush | No | Yes | Some |
| Flowlines | minimal | Yes | Yes |
| Pearlescent | No | No | Yes |
| Notched Izod impact @ −20° C. (ft-lbs/in) | 10.3 | 11.9 | 10.7 |
| % Ductility@−20° C. | 60 | 0 | 100 |

The use of a PDMS impact modifier built into the polycarbonate backbone and trans-esterified (Ex. 9) shows the best properties after extrusion and injection molding. There was minimal gate blush and flow lines, no visual pearlescence, and was >50% ductile at low temperatures. The regular blend of I and III with the color package (Comp. Ex. 5) showed some gate blush, visible flow lines, and was quite pearlescent in appearance. The polyestercarbonate with polyacrylic impact modifier (Ex. 3) showed the worst gate blush and had visible flow lines. The impact modifier also displayed 0% ductility at lower temperatures, which indicated better performance of I as an impact modifier by comparison.

The weatherability of impact-modified derivatives of III was also studied. The samples were weathered side-by-side under ASTM G26 standard weathering conditions. FIG. 3 displays the gloss retention data of III with different impact modifiers, wherein the highest gloss retention is seen with the PEC-PSC composition from Example 9.

Examples 10-17

Optimization of the optical properties of the PEC-PSC copolymers was performed using statistical design of experiments (DOE) tools (Design Expert 6.0.2 software, Stat Ease, Inc.). A fractional factorial DOE was performed with 4 variables at 2 levels. The variables, design levels and the responses are seen in Table 5. Examples 10-17 were prepared using a twin-screw extruder as described in previous examples.

TABLE 5

Examples 10-17: Screening DOE for PEC-PSC copolymers.

| Example Number | Catalyst level (ppm) | Residence Time | PEC:PSC (wt/wt) | Diketene additive (ppm) | Haze (%) | MVR (g/10 min) |
|---|---|---|---|---|---|---|
| 10 | 80 | Long | 70:30 | 100 | 8.7 | 1.63 |
| 11 | 80 | Long | 60:40 | 0 | 35.1 | 3.63 |
| 12 | 160 | Short | 70:30 | 100 | 16.5 | 3.59 |
| 13 | 80 | Short | 70:30 | 0 | 31.5 | 2.86 |
| 14 | 160 | Long | 70:30 | 100 | 15.7 | 4.11 |
| 15 | 160 | Long | 60:40 | 0 | 10.2 | 3.48 |
| 16 | 160 | Short | 60:40 | 0 | 14.8 | 3.93 |
| 17 | 80 | Short | 60:40 | 100 | 50.0 | 2.97 |

Different catalyst loadings (200 and 400 ppm) as well as different PEC:PSC ratios (30:70, 40:60) were used. Haze was found to decrease in the PEC-PSC copolymers in the range of 200 to 400 ppm TBPH. The mathematical model generated by the Design Expert 6.0.2 software indicated that the % haze was dependent on the PEC:PSC ratio and the catalyst concentration (>95% confidence). The MVR was found to not be significantly affected by the catalyst level, residence time, ratio of blend components, or diketene additive. The aliphatic ketene dimer additive (Aquapel 364®, Hercules Australia Pty Ltd) was blended into the formulation to react with the free phenol end groups formed from the hydrolysis of the carbonate linkages or trans-esterification products formed during the reactive extrusion process. Minimizing phenol groups will most likely improve hydrolytic stability, thermal stability, and color-body formation.

Examples 16-21

A higher catalyst loading (160-320 ppm) was used in the preparation of these examples (prepared according to the previous examples) to determine whether the percent haze could be decreased further with increased TBPH concentration. Table 6 shows the data from the higher catalyst DOE.

TABLE 6

High catalyst level DOE for PEC-PSC copolymers.

| Example number | PEC:PSC ratio | Catalyst Level (ppm) | Haze (%) |
|---|---|---|---|
| Example 16 | 40:60 | 320 | 32.8 |
| Example 17 | 50:50 | 160 | 13.1 |
| Example 18 | 40:60 | 160 | 16.8 |
| Example 19 | 45:55 | 240 | 19.2 |
| Example 20 | 50:50 | 320 | 16.4 |
| Example 21 | 40:60 | 160 | 21.4 |

From the data and the Design Expert analysis, increasing the catalyst level from 160 to 320 ppm increased the level of haze in the PEC-PSC copolymers to a higher than useful level, in the case of Example 16.

Example 22

Scale-up of PEC-PSC blends with TBPH catalyst. The variability of the reactive-extruded PEC-PSC materials was studied at a scale of 250 pounds in the twin-screw extruder described previously. The viscosity and haze profile over the entire run at different shear rates and residence times was studied. Table 7 shows viscosity and haze data for the PEC-PSC copolymers (40:60 ratio) with 160 ppm of TBPH.

TABLE 7

Extruder conditions versus % haze for 250 pound batch (Example 22) for a blend of 60% PSC-40% PEC.

| Example 22 - Sample no. | Screw speed (rpm) | Torque (%) | haze (3.2 mm) |
|---|---|---|---|
| 1 | 450 | 50 | 18.3 |
| 2 | 350 | 60 | 17.9 |
| 3 | 400 | 70 | 13.4 |
| 4 | 400 | 70 | 17.6 |
| 5 | 350 | 70 | 19.1 |
| 6 | 450 | 78 | 16.1 |
| 7 | 470 | 78 | 15.3 |

Design Expert analysis indicates that the residence time in the extruder does not significantly affect the haze or the melt viscosity of the materials. Materials composed of 60 wt % PSC and 40% PEC display haze values in the range of 13-20% when tras-esterified with TBPH catalyst. This level of haze is typical for PSC-copolymers made in the extruder with PEC and TBPH catalyst, and is significantly lower than a typical 60% PSC-40% PEC opaque blend prepared without catalyst, and which exhibits 70% haze. The glass transition temperatures remain constant at 159-160° C. during the experiment. Haze measurements taken at a plate thickness of 1.6 mm were measured at 5.2+/−0.5%.

All cited patents, patent applications, and other references are incorporated herein by reference in their entirety. The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. All ranges disclosed herein are inclusive of the endpoints, and endpoints directed to the same characteristic are independently combinable with each other. As used herein, the term "hydrocarbyl" refers to a substituted or unsubstited monovalent group comprising carbon and hydrogen, and may be aliphatic, aromatic, or a combination of aliphatic and aromatic. A hydrocarbyl group may also include one or more heteroatoms, such as oxygen, nitrogen, sulfur, and the like, wherein the heteroatom may be present as a substituent, e.g., a heteroatom-containing group such as halo, oxo, heterocycle, alkoxy, hydroxy, aryloxy, —NO$_2$, carboxy, acyl, amino, alkylamino, amido, and the like, as long as the substituent does not substantially interfere with manufacture or use of the compositions. The heteroatom may also be present as essential structural component of the group, for example in the form of an ester or ether linkage, as long as the heteroatom does not substantially interfere with manufacture or use of the compositions. A hydrocarbyl group may be linear, branched, or cyclic, including polycyclic, or a combination comprising one or more of these. Similarly, the term "hydrocarbylene," as used herein, refers to a divalent hydrocarbyl group. Apart from the specified valences and any limitations implied by a specified number of atoms comprising these groups, no other specific structure is implied. Unless otherwise specified, the versions of ASTM standards used herein are the active standards as defined by ASTM International.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
a first copolymer comprising
aromatic ester units of formula (1)

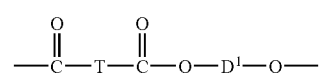
(1)

wherein T is a divalent aromatic radical and $D^1$ is a divalent organic radical, and carbonate units of formula (2)

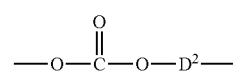
(2)

wherein at least 60% of the total number of $D^2$ groups are divalent aromatic organic radicals and the balance thereof are divalent aliphatic, alicyclic, or aromatic radicals;
a second copolymer comprising carbonate units of formula (2) and repeating siloxane units of formula (3)

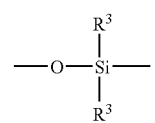
(3)

wherein each occurrence of $R^3$ is independently $C_1$-$C_{12}$ hydrocarbyl, and the second copolymer has a haze of less than or equal to 30%, measured according to ASTM D1003-00 at a thickness of 3.2 millimeters; and
a transesterification catalyst,
wherein a reaction product derived from the composition has a haze of less than or equal to 30%, measured according to ASTM D1003-00 at a thickness of 3.2 millimeters.

2. The composition of claim 1, wherein each of the first copolymer and the second copolymer has a haze of less than or equal to 30%, measured according to ASTM D1003-00 at a thickness of 3.2 millimeters.

3. The composition of claim 2, wherein the second copolymer is a substantially random copolymer.

4. The composition of claim 1, wherein each $D^1$ is independently a $C_{6-20}$ aromatic radical.

5. The composition of claim 1, wherein T is a residue of a mixture of isophthalic acid and terephthalic acid, wherein the weight ratio of terephthalic acid to isophthalic acid is 10:1 to 0.2:9.8.

6. The composition of claim 1, wherein each occurrence of $R^3$ is methyl.

7. The composition of claim 1, wherein the siloxane units are of the formula (11)

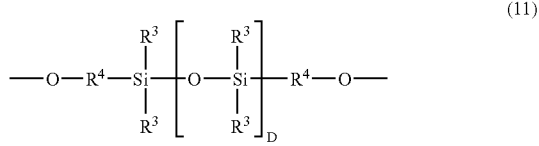
(11)

wherein each $R^3$ is independently a $C_1$-$C_{12}$ hydrocarbyl, D has an average value of 1 to 1000, and each occurrence of $R^4$ is independently a divalent $C_1$-$C_{30}$ hydrocarbylene.

8. The composition of claim 7, wherein each occurrence of $R^4$ independently of formula (12):

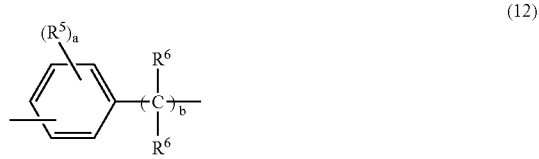
(12)

wherein each occurrence of $R^6$ is independently H or $C_1$-$C_{12}$ hydrocarbyl; each $R^5$ is independently halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy; b is 2 to 8, or 1 to 8 where at least one $R^6$ is not hydrogen; and each a is independently 0, 1, 2, 3, or 4, and when a is less than 4, a hydrogen is substituted to the aromatic ring such that the total number of hydrogens on the aromatic ring is 4-a.

9. The composition of claim 1, wherein the transesterification catalyst is a tetralkylphosphonium hydroxide, a tetraalkylphosphonium carbonate, a tetraatkylammonium hydroxide, a tetraalkyl ammonium carbonate, a tetraalkylammonium phosphite, a tetraalkylammonium acetate, or a combination comprising at least one of the foregoing catalysts, wherein each alkyl group independently has 1 to 6 carbon atoms.

10. The composition of claim 9 wherein the transesterification catalyst is a tetra $C_1$-$C_6$ alkyl phosphonium hydroxide.

11. The composition of claim 1, further comprising an additive selected from the group consisting of impact modifiers, fillers, reinforcing agents, thermal stabilizers, antioxidants, light stabilizers, gamma-irradiation stabilizers, plasticizers, colorants, extenders, antistatic agents, lubricants, mold releasing agents, flame retardants, anti-drip agents, and a combination comprising at least one of the foregoing additives.

12. The composition of claim 1, having substantially non-agglomerated polysiloxane domains, wherein no more than 10% of polysiloxane domains have a distance between any two domains of less than 10 nanometers as observed using transmission electron microscopy.

13. The composition of claim 1, wherein the composition is essentially free of carboxylic acid end groups as determined by $^{31}$P NMR.

14. The composition of claim 1, wherein the combination further comprises a polycarbonate polymer.

15. A method for forming a reaction product, comprising reacting, a combination comprising:
a first copolymer comprising
aromatic ester units of formula (1)

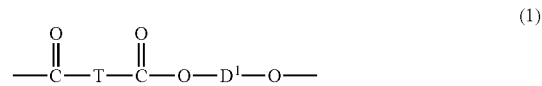
(1)

wherein T is a divalent aromatic radical and $D^1$ is a divalent organic radical, and carbonate units of formula (2)

(2)

wherein at least 60% of the total number of $D^2$ groups are divalent aromatic organic radicals and the balance thereof are divalent aliphatic, alicyclic, or aromatic radicals;
a second copolymer comprising carbonate units of formula (2) and repeating siloxane units of formula (3)

(3)

wherein each occurrence of $R^3$ is independently $C_1$-$C_{12}$ hydrocarbyl, and the second copolymer has a haze of less than or equal to 30%, measured according to ASTM D1003-00 at a thickness of 3.2 millimeters; and
a transesterification catalyst
wherein the combination and the reaction conditions are selected such that the reaction product as formed by the method has a haze of less than or equal to 30%, measured according to ASTM D1003-00 at a thickness of 3.2 millimeters.

16. The method of claim 15 wherein reacting is at 80 to 315° C.

17. The method of claim 15 wherein the reaction occurs in an extruder or a reactor.

18. The method of claim 17 wherein the extruder is a twin-screw extruder.

19. A thermoplastic composition comprising the reaction product of claim 1.

20. An article comprising the thermoplastic composition of claim 19.

21. A thermoplastic composition comprising the reaction product made by the method of claim 15.

22. An article comprising the thermoplastic composition made by claim 15.

23. A composition comprising
a polyester polycarbonate copolymer, comprising ester units of the formula:

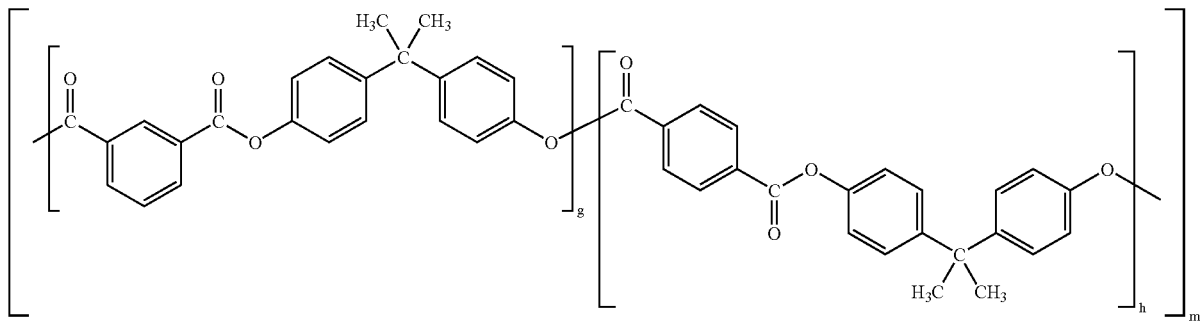

wherein the molar ratio of isophthalate ester units g to terephthalate ester units h is 99:1 to 1:99, and carbonate units of the formula:

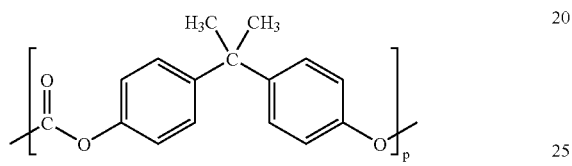

wherein the molar ratio of ester units m to carbonate units p is about 99:1 to 1:99;

a polysiloxane polycarbonate copolymer, comprising polysiloxane units of the formula:

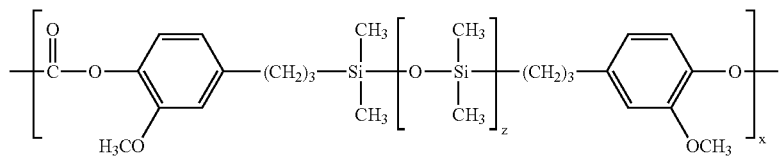

wherein D is 5 to 100, and the carbonate units of the formula:

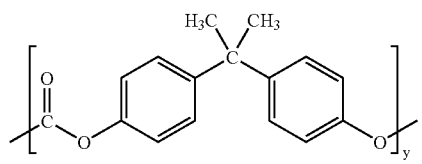

wherein the weight ratio of polysiloxane units x to carbonate units y is 1:99 to 30:70, and the polysiloxane polycarbonate copolymer has a haze of less than or equal to 30%, measured according to ASTM D1003-00 at a thickness of 3.2 millimeters; and wherein the weight ratio of the polyester polycarbonate to the polysiloxane polycarbonate is 20:80 to 90:10; and 40 to 220 ppm of a transesterification catalyst, wherein a reaction product derived from the composition has a haze of less than or equal to 30%, measured according to ASTM D1003-00 at a thickness of 3.2 millimeters.

24. A composition comprising a polyester polycarbonate copolymer comprising a polyester unit of the formula:

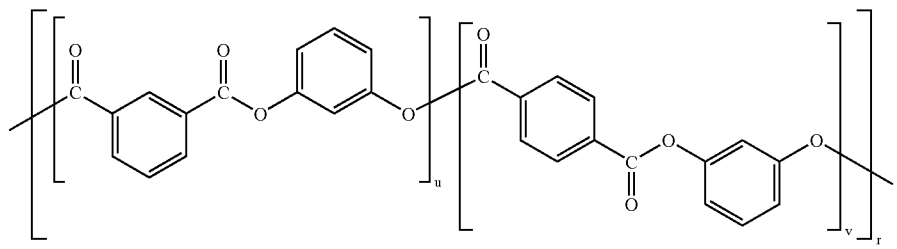

wherein the ratio of isophthalate units u to terephthalate units v is 99:1 to 1:99, first and second carbonate units of formulas:

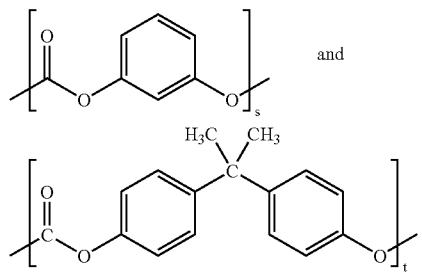
and
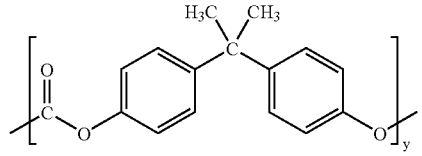

wherein the mol % r of the polyester unit is 10 to 70%, the mol % s of the first polycarbonate unit is 10 to 90%, and the mole-% t of the second polycarbonate unit is 40 to 98%, wherein r+s+t=100%;

a polysiloxane polycarbonate copolymer, comprising a polysiloxane unit of the formula

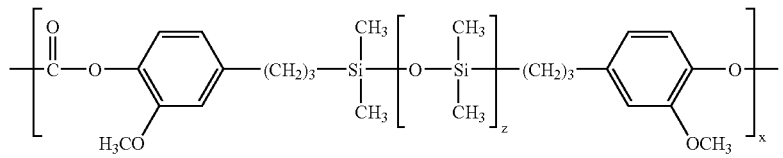

wherein D is 5 to 100, and a carbonate unit of the formula:

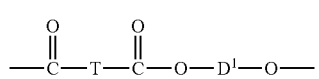

wherein the weight ratio of polysiloxane unit x to polycarbonate unit y is 1:99 to 30:70, and the polysiloxane polycarbonate copolymer has a haze of less than or equal to 30%, measured according to ASTM D1003-00 at a thickness of 3.2 millimeters; and wherein the weight ratio of the polyester polycarbonate to the polysiloxane polycarbonate is 1:99 to 99:1; and 40 to 220 ppm of a transesterification catalyst,
wherein a reaction product derived from the composition has a haze of less than or equal to 30%, measured according to ASTM D1003-00 at a thickness of 3.2 millimeters.

25. The composition of claim 23, wherein the mixture further comprises a polycarbonate polymer.

26. The composition of claim 24, wherein the mixture further comprises a polycarbonate polymer.

27. A composition consisting essentially of:
a first copolymer comprising
aromatic ester units of formula (1)

wherein T is a divalent aromatic radical and $D^1$ is a divalent organic radical, and carbonate units of formula (2)

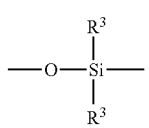

wherein at least 60% of the total number of $D^2$ groups are divalent aromatic organic radicals and the balance thereof are divalent aliphatic, alicyclic, or aromatic radicals;

a second copolymer comprising carbonate units of formula (2) and repeating siloxane units of formula (3)

$$—O—\underset{\underset{R^3}{|}}{\overset{\overset{R^3}{|}}{Si}}—$$ (3)

wherein each occurrence of $R^3$ is independently $C_1$-$C_{12}$ hydrocarbyl, and the second copolymer has a haze of less than or equal to 30%, measured according to ASTM D1003-00 at a thickness of 3.2 millimeters; and a transesterification catalyst, wherein the wherein the type and amount of the first copolymer, second copolymer, transesterification catalyst are selected such that a reaction product derived from the composition has a haze of less than or equal to 30%, measured according to ASTM D1003-00 at a thickness of 3.2 millimeters.

28. A composition consisting of:
a first copolymer comprising
aromatic ester units of formula (1)

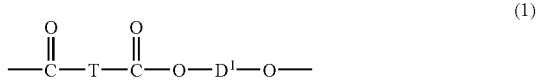

wherein T is a divalent aromatic radical and $D^1$ is a divalent organic radical, and carbonate units of formula (2)

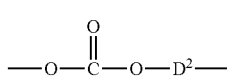

wherein at least 60% of the total number of $D^2$ groups are divalent aromatic organic radicals and the balance thereof are divalent aliphatic, alicyclic, or aromatic radicals;

a second copolymer comprising carbonate units of formula (2) and repeating siloxane units of formula (3)

wherein each occurrence of $R^3$ is independently $C_1$-$C_{12}$ hydrocarbyl, and the second copolymer has a haze of less than or equal to 30%, measured according to ASTM D1003-00 at a thickness of 3.2 millimeters; and a transesterification catalyst, wherein the type and amount of the first copolymer, second copolymer, and transesterification catalyst are selected such that a reaction product derived from the composition has a haze of less than or equal to 30%, measured according to ASTM D1003-00 at a thickness of 3.2 millimeters.

29. The composition of claim 28, wherein the first copolymer consists of aromatic ester units of formula (1), wherein T is a divalent aromatic radical and $D^1$ is a divalent organic radical, and carbonate units of formula (2), wherein at least 60% of the total number of $D^2$ groups are divalent aromatic organic radicals and the balance thereof are divalent aliphatic, alicyclic, or aromatic radicals.

30. The composition of claim 28 wherein the second copolymer consists of carbonate units of formula (2) and repeating siloxane units of formula (3), wherein each occurrence of $R^3$ is independently $C_1$-$C_{12}$ hydrocarbyl; and wherein the second copolymer has a haze of less than or equal to 30%, measured according to ASTM D1003-00 at a thickness of 3.2 millimeters.

31. A composition comprising:
a first copolymer comprising
aromatic ester units of formula (1)

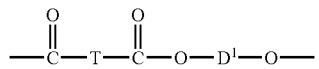

(1)

wherein T is a divalent aromatic radical arid $D^1$ is a divalent organic radical, and carbonate units of formula (2)

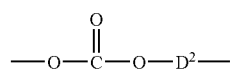

(2)

wherein at least 60% of the total number of $D^2$ groups are divalent aromatic organic radicals and the balance thereof are divalent aliphatic, alicyclic, or aromatic radicals;

a second copolymer comprising carbonate units of formula (2) and repeating siloxane units of formula (11)

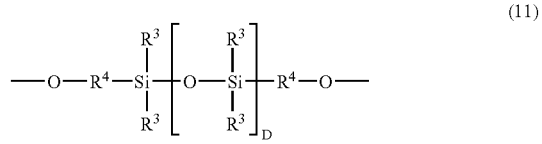

(11)

wherein each $R^3$ is independently a $C_1$-$C_{12}$ hydrocarbyl, D has an average value of 1 to 1000, and each occurrence of $R^4$ is independently a divalent $C_1$-$C_{30}$ hydrocarbylene, and the second copolymer has a haze of less than or equal to 30%, measured according to ASTM D1003-00 at a thickness of 3.2 millimeters; and a transestenfication catalyst, wherein a reaction product derived from the composition has a haze of less than or equal to 30%, measured according to ASTM D1003-00 at a thickness of 3.2 millimeters.

* * * * *